United States Patent [19]

Fujimura et al.

[11] Patent Number: 5,340,949

[45] Date of Patent: Aug. 23, 1994

[54] METERING SYSTEM CAPABLE OF EASILY EFFECTING HIGH-ACCURACY METERING FOR VARIOUS WORKS INCLUDING STICKY MATERIALS

[75] Inventors: Masahiro Fujimura; Mitsuru Yoshida, both of Atsugi, Japan

[73] Assignee: Anritsu Corporation, Tokyo, Japan

[21] Appl. No.: 855,692

[22] PCT Filed: Sep. 17, 1991

[86] PCT No.: PCT/JP91/01230

§ 371 Date: May 4, 1992

§ 102(e) Date: May 4, 1992

[87] PCT Pub. No.: WO92/05410

PCT Pub. Date: Apr. 2, 1992

[30] Foreign Application Priority Data

Sep. 17, 1990 [JP] Japan .................. 2-243840
Dec. 27, 1990 [JP] Japan .................. 2-402324[U]
Jul. 19, 1991 [JP] Japan .................. 3-203535
Aug. 2, 1991 [JP] Japan .................. 3-68506[U]
Aug. 20, 1991 [JP] Japan .................. 3-73015[U]
Aug. 20, 1991 [JP] Japan .................. 3-231178

[51] Int. Cl.$^5$ .................. G01G 13/00; G01G 13/16; B65B 1/30
[52] U.S. Cl. .................. 177/25.18; 141/83; 141/89; 141/128; 222/77; 177/57; 177/59
[58] Field of Search .................. 222/55, 57, 77, 148, 222/413, 56; 177/25.18, 56, 57, 59; 141/83, 89, 90, 128

[56] References Cited

U.S. PATENT DOCUMENTS

| | | | |
|---|---|---|---|
| 657,856 | 9/1900 | Cook | 177/56 |
| 2,660,394 | 11/1953 | Skeuse et al. | 177/56 |
| 3,623,560 | 11/1971 | Stone | 222/55 |
| 3,719,214 | 3/1973 | Erndt | 177/116 X |
| 4,437,527 | 3/1984 | Omae et al. | 177/25.18 |
| 4,478,300 | 10/1984 | Mikami | 177/59 |
| 4,478,301 | 10/1984 | Cochran, Jr. et al. | 177/70 |
| 4,480,706 | 11/1984 | Rosenthal | 177/50 |
| 4,559,981 | 12/1985 | Hirano | 177/25.18 X |
| 4,612,964 | 9/1986 | Durant | 141/68 |
| 4,662,462 | 5/1987 | Kitagawa et al. | 177/25 |
| 4,662,508 | 5/1987 | Inoue et al. | 177/25.18 X |
| 4,669,557 | 6/1987 | Nakagawa | |
| 4,828,054 | 5/1989 | Mosher | 177/25.18 |

(List continued on next page.)

FOREIGN PATENT DOCUMENTS

0046130 2/1982 European Pat. Off. .......... 177/59

(List continued on next page.)

*Primary Examiner*—Benjamin R. Fuller
*Assistant Examiner*—Randy W. Gibson
*Attorney, Agent, or Firm*—Frishauf, Holtz, Goodman & Woodward

[57] ABSTRACT

A plurality of pool hoppers (5) for storing a predetermined quantity of an object (W) of metering are each formed in the shape of a hollow, bottomless cylinder and are arranged side by side. A plurality of metering hoppers (7) for weighing a predetermined quantity of the object (W) supplied from the pool hoppers (5) are each formed in the shape of a hollow, bottomless cylinder and are arranged under the pool hoppers (5). A collecting device (13, 12a) for collectively storing and then discharging the object (W) supplied from the metering hoppers (7) is provided under the metering hoppers (7). A plurality of indentations (205) are arranged on the inner periphery of a barrel-type container body (201) of the metering hopper. The object (W) of metering is in point contact with the indentations (205), so that all of the object of metering is discharged from the container body. A remover (321) can be provided including a plurality of rods (321a) vertically arranged in the container body at a small distance from the inner peripheral surface of the container body. A remover rotating mechanism (22) rotates the remover (321) so that the rods (321a) move along the inner peripheral surface of the container body, thereby preventing the object (W) of metering from adhering to the inner peripheral surface of the container body.

8 Claims, 29 Drawing Sheets

U.S. PATENT DOCUMENTS

| | | | |
|---|---|---|---|
| 4,846,291 | 7/1989 | Osawa et al. | 177/25.18 |
| 4,887,679 | 12/1989 | Bacon et al. | 177/245 |
| 4,944,428 | 7/1990 | Gmür et al. | |
| 4,957,176 | 9/1990 | Roth | |
| 5,024,352 | 6/1991 | Gmür | |
| 5,038,973 | 8/1991 | Gmür | |
| 5,092,413 | 3/1992 | Andrews | 177/56 |
| 5,092,414 | 3/1992 | Blezard | 177/52 |
| 5,142,968 | 9/1992 | Caron et al. | 99/404 |
| 5,145,009 | 9/1992 | Mheidle et al. | 141/83 |

FOREIGN PATENT DOCUMENTS

| | | | |
|---|---|---|---|
| 0171295 | 2/1986 | European Pat. Off. | |
| 3914925A1 | 11/1989 | Fed. Rep. of Germany | |
| 3827927A1 | 2/1990 | Fed. Rep. of Germany | |
| 17-1113 | 1/1942 | Japan | |
| 55-82019 | 6/1980 | Japan | |
| 57-171540 | 10/1982 | Japan | |
| 0004821 | 1/1985 | Japan | 177/56 |
| 60-154121 | 8/1985 | Japan | |
| 62-170530 | 10/1987 | Japan | |
| 2-17300 | 5/1990 | Japan | |
| WO86/05875 | 10/1986 | PCT Int'l Appl. | |
| 2202339 | 9/1988 | United Kingdom | 177/56 |

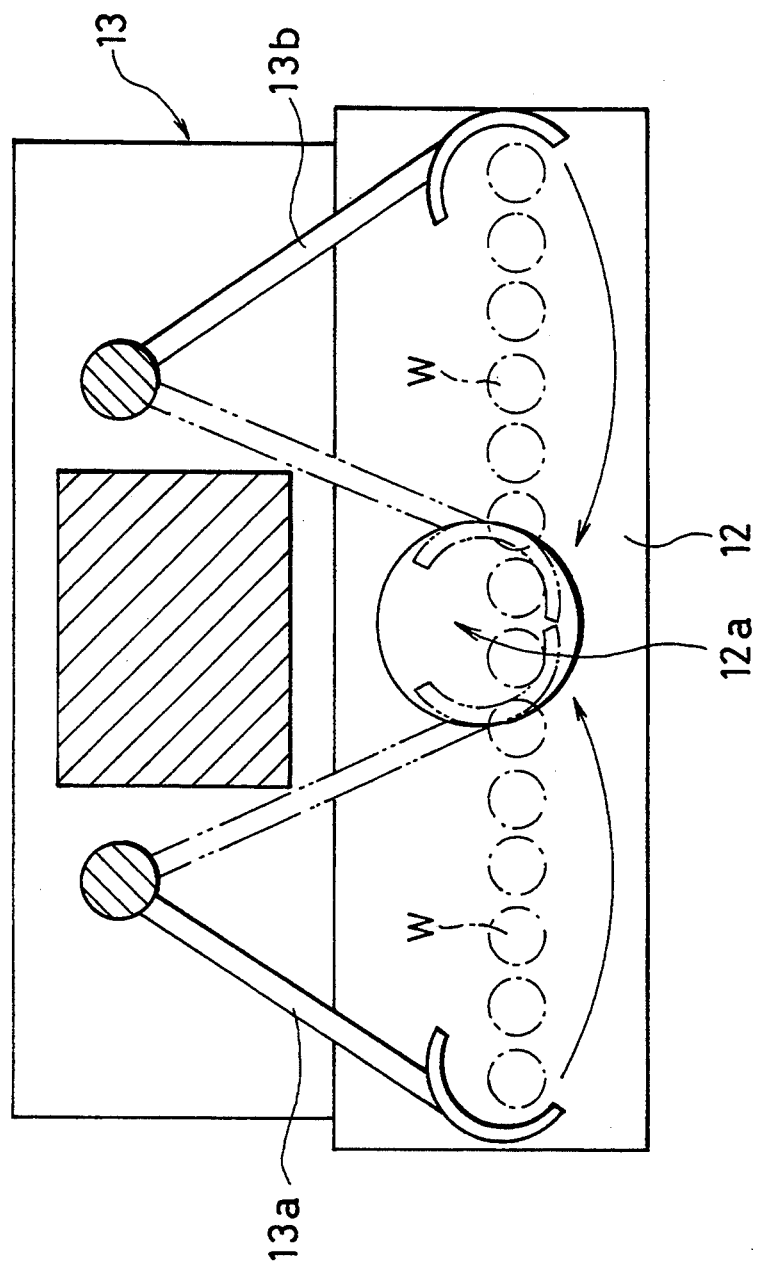

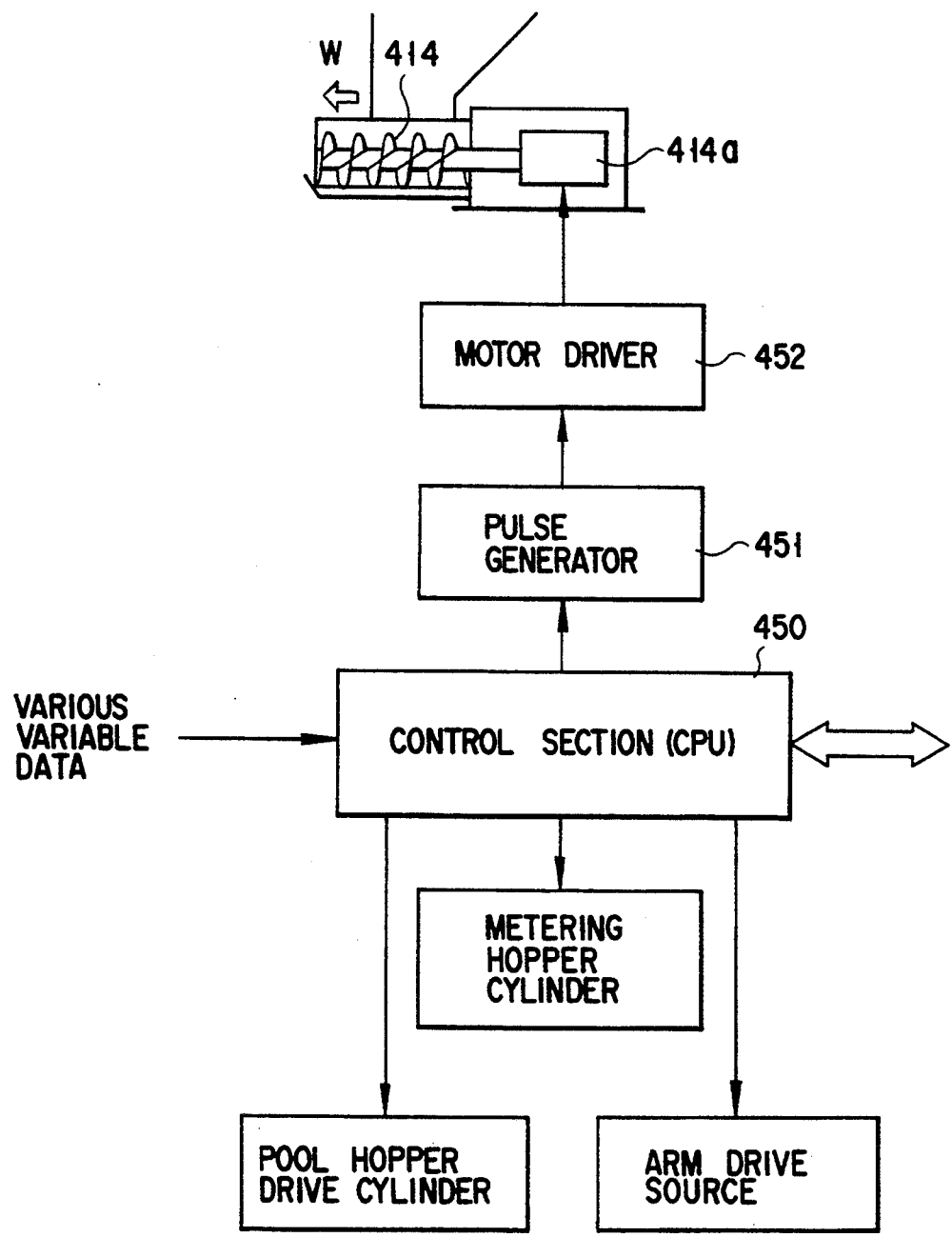
F I G. 27

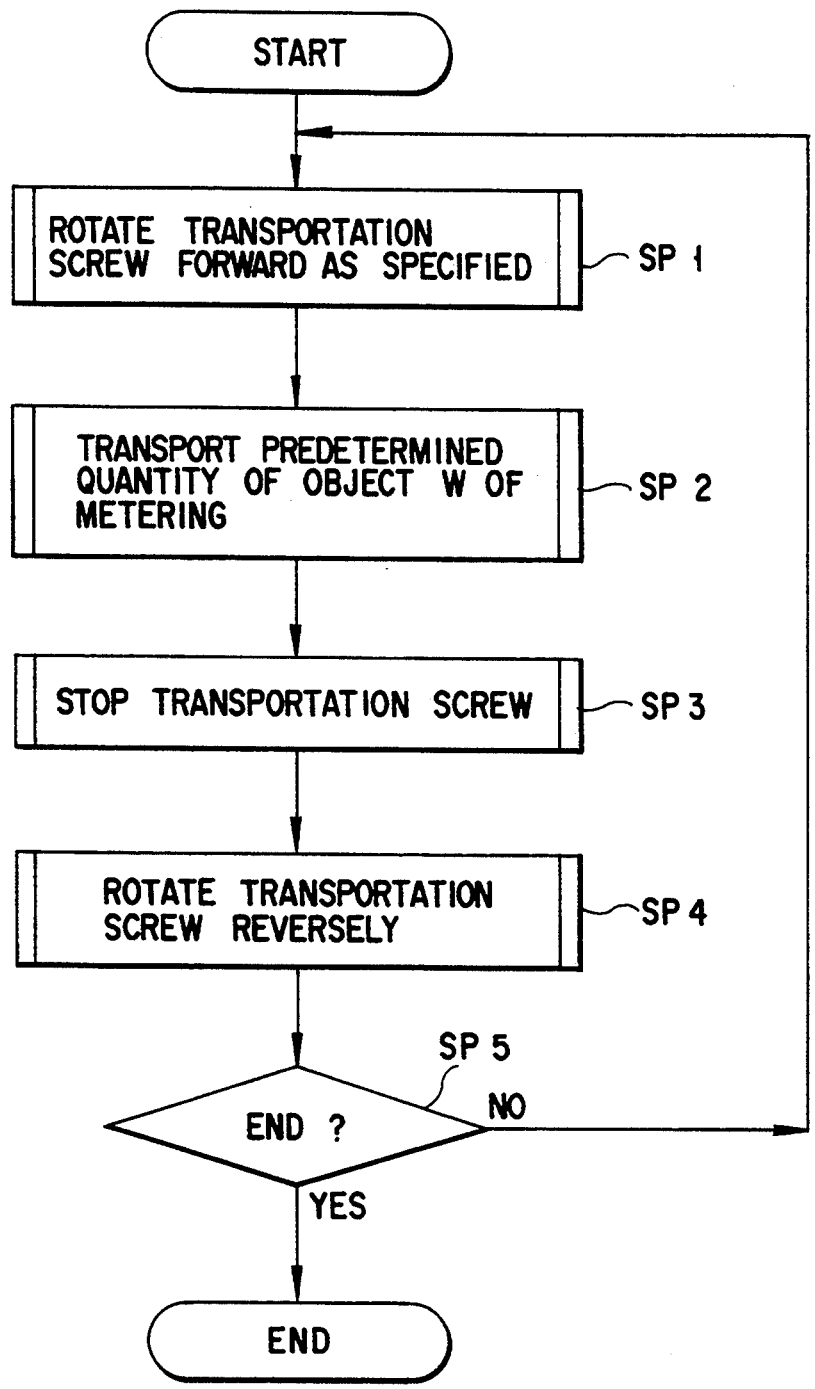
F I G. 28

METERING SYSTEM CAPABLE OF EASILY EFFECTING HIGH-ACCURACY METERING FOR VARIOUS WORKS INCLUDING STICKY MATERIALS

TECHNICAL FIELD

The present invention relates generally to a metering apparatus, and more particularly, to a metering system adapted for a combination metering machine used to discharge an object of metering (work), such as foodstuff, to the outside every time a predetermined quantity is measured.

BACKGROUND ART

Conventionally known is a combination metering machine, such as the one shown the cutaway side view of FIG. 30, as an apparatus in which an object of metering, such as foodstuff, is distributed to a plurality of hoppers and weighed in individual batches, a combination of the batches is selected so that the sum total of individual measured weight values is approximate to a target value, and the selected batches of the object of metering are discharged and joined, thereby obtaining a variable resembling the target value.

This apparatus comprises a circular feeder 21 provided in the central portion of the apparatus, a plurality of straight-advance feeders 22 arranged extending radially from the central portion, intermediate hoppers 23 and metering hoppers 24 arranged individually under the straight-advance feeders 22, open-close mechanisms 25 for the hoppers 23 and 24, a discharge chute 28, a collecting chute 26, and a collecting hopper 27.

When the object of metering is transported to the circular feeder 21 by means of a conveyor or the like, in this apparatus, the object of metering is radially distributed and introduced into the individual intermediate hoppers 23 by means of the straight-advance feeders 22. The respective discharge gates of the intermediate hoppers 23 open as the open-close mechanisms 25 are driven, whereby the contained object of metering is discharged to the corresponding metering hoppers 24. The metering hoppers 24 receive and weigh the object of metering discharged from the intermediate hoppers 23. The open-close mechanisms 25 are operated to open the respective discharge gates of the metering hoppers 24, thereby allowing the object of metering to be discharged through the gates, so that the quantity of the object of metering can be approximated to the target value by combining the batches of the object of metering contained in the individual metering hoppers 24. The batches of the object of metering from the metering hoppers 24 are collected in the collecting chute 26 by means of the discharge chute 28, discharged through the collecting hopper 27 to be, for example, bagged, and transported to the next stage.

The above-described combination metering machine can be used for metering a bulk material. If it is used to meter a sticky material, however, it is subject to various drawbacks such that the sticky material adheres to and remains on the inner surface of each hopper, thereby lowering the metering accuracy and processing speed, and its maintenance takes time.

To avoid this, a net is provided on the inner surface of each hopper so that the contact surface between the hopper and the object of metering is reduced to prevent the object of metering from remaining on the inner surface. In this case, however, arranging the net takes time, and the net makes it more difficult to clean the inner surface of each hopper. Therefore, the previously handled object of metering is left even after the cleaning, thus entailing insanitary conditions, and the metering accuracy is lowered.

Moreover, the net is liable to be damaged during the cleaning operation, and resulting metal pieces may possibly be entrapped.

Conventionally, furthermore, the individual hoppers are arranged circumferentially along the side face of the metering machine, a cleaner must make a round of the side portion of the metering machine as he or she cleans all the hoppers. In the conventional combination metering machine, moreover, the hoppers cannot be easily removed.

FIG. 31 is a front view showing a conventional combination metering machine in which a plurality of batches of an object of metering (work) are combined to a predetermined weight as the object is discharged.

This combination metering machine, which comprises a circular feeder 141, straight-advance feeders 142, intermediate hoppers 143, metering hoppers 144, a collecting chute 145, and a discharge hopper 146, has a circular plane configuration such that the intermediate hoppers 143 and the metering hoppers 144 are radially arranged around the circular feeder 141.

In this combination metering machine, the work is first supplied to the circular feeder 141 by means of a conveyor or the like and distributed in a radial manner. Then, a predetermined quantity of the work is introduced into each intermediate hopper 143 by means of each corresponding straight-advance feeder 142.

Subsequently, the intermediate hoppers 143 discharge and supply this predetermined quantity of the work to the metering hoppers 144 right under them. The batches of the work contained in the individual intermediate hoppers 144 are combined to set a target-value weight. Further, the metering hoppers 144 selected corresponding to the target-value weight discharge the work into the collecting chute 145. The collecting chute 145 collects the batches of the work having the target-value weight so that they get together in the discharge hopper 146.

The discharge hopper 146 opens its discharge gate at a predetermined timing, thereby allowing the work with the target-value weight to be discharged downward. The discharged work is transported to the next stage by means of a conveyor or other transportation means, whereupon it is subjected to bagging or some other process.

FIG. 32 is a side view of the discharge hopper 146. The discharge hopper 146, which is supported on the apparatus body by means of a supporting portion 147, has a discharge gate 148 at its lower portion. The discharge gate 148 is opened and closed as indicated by chain line in the drawing by means of an open-close mechanism 149.

The open-close mechanism 149 is composed of link arms 150a, 150b and 150c connected to one another. A press member 152 of a drive unit can engage the link arm 150a, and the discharge gate 148 is connected to the link arm 150c. Thus, when the press member 152 advances, the link arms 150a, 150b and 150c rock to open the discharge gate 148 as indicated by chain line in the drawing, thereby allowing the work to be discharged.

In the conventional combination metering machine constructed in this manner, however, the discharge hopper 146 is subject to the following drawbacks.

First, if the discharge hopper 146 receives a non-conforming (NG) work batch such that the target-value weight cannot be attained after the selection of a plurality of metering hoppers 144, for example, the discharge hopper 146 cannot discriminate the conformity, so that the work can be discharge only to the same position under the discharge hopper 146 at any time. Therefore, conforming work batches must be separated from nonconforming ones outside the combination metering machine, which requires much labor.

Secondly, the discharge hopper 146 is arranged so that the work is discharged by operating the discharge gate 148, so that contact sounds or noises are produced at the contact region between the discharge gate 148 and the discharge hopper 146 every time the gate is opened and closed.

Since the discharge hopper 146 itself has a tetragonal plane section and a substantially trapezoidal lateral section, moreover, its construction is complicated, and the discharge hopper 146 cannot be easily cleaned.

Furthermore, the construction of the open-close mechanism 149 for opening and closing the discharge gate 148 of the discharge hopper 146 is complicated, the components used are too many to enjoy lightweight design, the cleaning operation is not easy, and high costs are entailed.

A combination metering apparatus is used as an apparatus for efficiently collecting, for example, articles having varied weights in sets of a plurality of pieces for each prescribed weight, in the manner described above. The combination metering apparatus of this type incorporates a large number of metering machines, which each comprise a metering base and a metering container placed on the metering base. Batches of an object of metering are put individually into the respective metering containers of all the metering machines, and their respective weights are measured. Since the respective weights of the batches of the object of metering in the measured metering containers are not uniform, a plurality of batches of the object of measurement are selected among all the batches of the object of metering so that the prescribed weight of final articles of trade, e.g., bagged ones, can be obtained.

In each metering machine incorporated in this combination metering apparatus, it is natural to accurately measure the object of metering contained in its own metering container. If the object of metering contained in the metering container is selected as one of articles for bagging, it must be securely discharged in a very short time.

However, sticky materials, such as pickled vegetables, or highly watery materials adhere to the inner peripheral surface of the metering container. In this case, some of the object of metering adhering to the inner peripheral surface is left as it is without dropping even though the lower end portion of the container is opened downward. In consequence, the weight of the dropped and bagged article cannot attain the level of the prescribed weight.

Conventionally proposed as means for removing the object of metering, thus adhering to the inner peripheral surface, is a metering container which is designed so that a net is provided adjacent to the inner peripheral surface lest the object of metering directly touch the inner peripheral surface. Also proposed is a method in which a shutter is opened, and an object of metering, adhering to an inner peripheral surface inside the shutter without dropping, is separated by blowing compressed air against the inner peripheral surface.

According to the method in which the net is used, however, the object of metering adheres to the net, so that the net must be frequently washed. According to the method in which the compressed air is used, on the other hand, the object of metering is separated indirectly from the inner peripheral surface, so that all the object of metering cannot always be securely separated and dropped from the inner peripheral surface.

Further, pool hoppers and metering hoppers used in the conventional metering apparatus of this type have shapes such that it is difficult to discharge the object of metering in a short time, and a sticky object of metering, in particular, is liable to adhere to the hoppers, and the hoppers cannot be easily cleaned.

DISCLOSURE OF THE INVENTION

A first object of the present invention is to provide a metering apparatus capable of accurately measuring the quantity of an object of metering in a short time, even in case the object of metering is a sticky material, in particular, and easily cleaning each hopper.

A second object of the present invention is to provide a combination metering machine capable of accurately measuring the quantity of an object of metering, even in case the object of metering is a sticky material, in particular, and easily cleaning each hopper.

Further, a third object of the present invention is to provide a metering apparatus provided with a lowcost, noiseless work discharge mechanism, which can selectively discharge a work when the work is regarded as rejectable after metering, and in which a discharge hopper can be easily cleaned, and the work can be discharged by means of a simple mechanism.

Further, a fourth object of the present invention is to provide a metering apparatus provided with a barrel-type container to which even a sticky object of metering never adheres, and which can be easily cleaned.

Moreover, a fifth object of the present invention is to provide a metering apparatus provided with a metering container, in which a remover formed of a plurality of rods arranged in a container body in close vicinity to the outer peripheral surface thereof so that an object of metering adhering to the inner peripheral surface can be securely dropped when the container body is pushed out of a metering base, whereby the accuracy of measurement of the weight of the dropped object of metering can be considerably improved.

Furthermore, a sixth object of the present invention is to provide a transportation screw control method for a metering apparatus, in which a work can be prevented from dropping when it is stopped from being intermittently transported to a pool hopper, for example, a predetermined quantity of the work can be transported at the time of transportation, and the work can be easily transported without being caught by a transportation screw during the transportation of the work, thus facilitating high-accuracy metering.

According to a first aspect of the present invention, there is provided a metering apparatus which comprises: pool hopper means formed of a hollow, bottomless barrel-type container; first base plate means carrying the pool hopper means thereon and relatively slidable with respect to the pool hopper means in order to temporarily store a predetermined quantity of an object of metering to be introduced into the pool hopper means and supply the object to a lower stage; metering hopper means formed of a hollow, bottomless barrel-type container; and second base plate means carrying the metering hopper means thereon, including means for weighing the predetermined quantity of the object of metering supplied from the pool hopper means to the metering hopper means, and relatively slidable with respect to the metering hopper means in order to supply the weighed object of metering to the lower stage.

According to this arrangement, the quantity of the object of metering can be accurately measured in a short time, even in case the object of metering is a sticky material, in particular, and each hopper can be easily cleaned.

According to a second aspect of the present invention, there is provided a combination metering machine which comprises: a plurality of pool hopper means formed of a hollow, bottomless barrel-type container each and arranged in a predetermined configuration; first base plate means carrying the plurality of pool hopper means thereon and relatively slidable with respect to the plurality of pool hopper means in order to temporarily store predetermined quantities of an object of metering to be introduced individually into the plurality of pool hopper means and Supply the object to a lower stage; a plurality of metering hopper means formed of a hollow, bottomless barrel-type container each and arranged in a predetermined configuration; a plurality of second base plate means carrying the plurality of metering hopper means thereon, including means for individually weighing the predetermined quantities of the object of metering supplied correspondingly from the plurality of pool hopper means to the plurality of metering hopper means, and relatively slidable individually with respect to the plurality of metering hopper means in order to supply the weighed object of metering in selective combinations to the lower stage; and collecting means for collecting the weighed object of metering supplied in selective combinations from the plurality of metering hopper means.

Thus, in order to achieve the second object, according to the second aspect, the combination metering machine is characterized by comprising pool hoppers each in the shape of a barrel and used to store the predetermined quantities of the object of metering and supply the object to the lower stage, metering hoppers each in the form of a barrel and used to weigh the predetermined quantities of the object W of metering supplied from the pool hoppers and supply the object to the lower stage, and a collecting device for collecting and discharging the object of metering supplied from the metering hoppers, and in that the pool hoppers, metering hoppers, and collecting device are arranged substantially in the vertical direction.

Referring to FIG. 1, according to this arrangement, the object W of metering is first introduced into pool hoppers 5 and then weighed by means of metering hoppers 7, and is further discharged through a collecting chute 12a. Since the pool hoppers 5, metering hoppers 7, and collecting chute 12a are arranged in the vertical direction, maintenance is easy. Further, the pool hoppers 5 and the metering hoppers 7, which are barrel-shaped, can be easily cleaned.

According to a third aspect of the present invention, there is provided a combination metering apparatus which comprises: a combination metering machine body for selectively combining a plurality of units of a work to a predetermined weight and collectively discharging the work; a hollow, bottomless barrel-type container having open top and bottom end portions and disposed in a position to which the plurality of units of the work, combinedly weighed by means of the combination metering machine body, are collectively discharged; a plate member disposed at the lower end portion of the barrel-type container; and actuator means for relatively moving the barrel-type container and the plate member in accordance with the propriety of the combined weighing by means of the combination metering machine body, thereby causing the plurality of units of the work in the barrel-type container to be discharged to different discharge portions, depending on the propriety.

Thus, in order to achieve the third object, according to the third aspect, the metering apparatus, having the work discharge mechanism provided for the combination metering machine in which the work units are combined to the predetermined weight and discharged, is characterized by comprising the hollow, bottomless barrel-type container open at the top and bottom end portions thereof and disposed in the position to which the work units are collected and discharged to the outside after being combinedly weighed, the plate member mounted on at the lower end portion of the barrel-type container, and an actuator for moving the barrel-type container or the plate member, thereby causing work units in the barrel-type container to be discharged individually to different positions.

According to this arrangement, the barrel-type container on the plate member or the plate member is moved by operating the actuator so that the work units contained in the barrel-type container can be discharged individually to the different positions, whereby the conformity of the work units can be discriminated. Further, the barrel-type container, which is hollow and bottomless, can be easily cleaned, and operating noises produced between the container and the plate member during movement can be lowered.

According to a fourth aspect of the present invention, based on at least the first and second aspect, there is provided a metering apparatus in which each of the pool hopper means and the metering hopper means is provided with a plurality of indentations on the inner peripheral wall thereof, extending along the barrel axis.

Thus, in order to achieve the fourth object, according to the fourth aspect, the metering apparatus is characterized in that the pool hoppers and the metering hoppers are formed each having a substantially barrel-shaped section, and are each provided with the plurality of indentations on the inner peripheral wall thereof.

According to this arrangement, the plurality of indentations are arranged on the inner peripheral wall of the container body used as each of the pool hoppers and the metering hoppers, so that the introduced object of metering is contained in point contact with the indentations. At the time of discharge, therefore, all the object of metering contained can be discharged, so that cleaning can be easily effected even in case the object of metering is a sticky material, in particular.

According to a fifth aspect of the present invention, based on at least the first and second aspects, there is provided a metering apparatus in which at least the metering hopper means is fitted with a remover including a plurality of rods vertically arranged in the container thereof at a fine distance from the inner peripheral surface of the container, and a remover rotating mechanism for rotating the remover so that the rods move along the inner peripheral surface, thereby causing the object of metering adhering to the inner peripheral surface to drop, when the container is slid on the upper surface of the second base plate means to be off the upper surface after the object of metering is weighed by means of the second base plate means.

Thus, in order to achieve the fifth object, according to the fifth aspect, the metering apparatus comprises the cylindrical container body open at the top and bottom ends thereof and containing the object of metering supplied from the outside, the container body being slidably mounted on the top surface of a metering base for measuring the weight of an object substantially placed on the upper surface, the remover composed of the plurality of rods vertically arranged in the container body at a fine distance from the inner peripheral surface of the container body, and the remover rotating mechanism for rotating the remover so that the rods move along the inner peripheral surface, thereby causing the object of metering adhering to the inner peripheral surface to drop through the bottom opening, when the container body is slid on the upper surface of the metering base to be off the upper surface after the object of metering is weighed.

According to this arrangement, the weight of the object of metering is measured when the object of metering is contained in the container body placed on the upper surface of the metering base. When the weight measurement is finished, the container body is pushed out of the metering base. As a result, the object of metering contained in the container body is dropped downward through the bottom opening. In this case, the remover rotates with the container body off the metering base, so that the object of metering adhering to the inner peripheral surface of the container body, if any, is forcibly separated therefrom by means of the rods of the remover, and therefore, drops through the bottom opening.

According to a sixth aspect of the present invention, there is provided a transportation screw control method for a metering apparatus, which comprises a transportation screw provided in a guide path for transporting a work, as an object of metering, and a drive motor for intermittently rotating the transportation screw, and transports a predetermined quantity of the work from the proximal end side of the guide path to the distal end side, which comprises:

(a) a step of forwardly rotating the transportation screw for a predetermined variable, thereby transporting and then stopping the work;

(b) a step of reversely rotating the transportation screw for at least one revolution after the work is stopped; and (c) a step of continuously repeating the steps (a) and (b).

Thus, in order to achieve the sixth object, according to the sixth aspect, the transportation screw control method is characterized in that the predetermined quantity of the work W is transported from the proximal end side of the guide path to the distal end side by intermittently rotating the transportation screw provided in the guide path by means of the drive motor provided at the proximal end of the transportation screw, and that the operation to forwardly rotate the transportation screw for the predetermined variable, thereby transporting and then stopping the work, and then reversely rotate the transportation screw for at least one revolution is continuously repeated.

According to this arrangement, the predetermined quantity of the work corresponding to the number of revolutions is transported along the guide path portion from the proximal end side of the transportation screw to the distal end side as the transportation screw is forwardly rotated by operating the drive motor. As the transportation screw makes at least one reverse revolution after rotating for the predetermined variable and then stopping, the work at the distal end side of the guide path is moved back, so that the work can never drop from the guide path end position.

BRIEF DESCRIPTION OF THE DRAWINGS

FIG. 5 is a partial plan view showing a scraper;

FIG. 27 is a block diagram showing a circuit configuration of a transportation screw control mechanism used in the fifth embodiment;

FIG. 28 is an operational flow chart showing a control mode for the transportation screw according to the fifth embodiment of the present invention;

DETAILED DESCRIPTION

Figure 1:
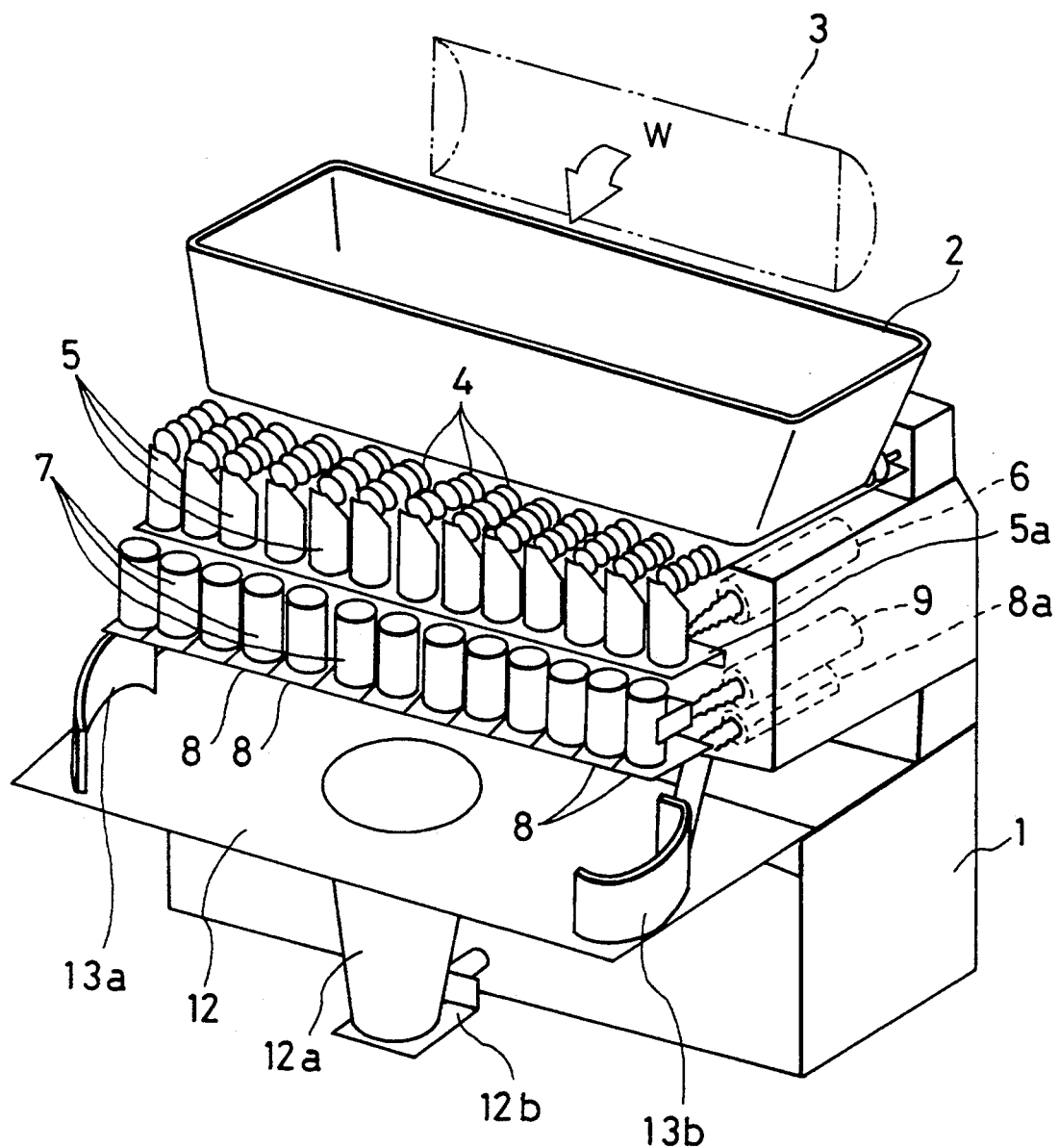
FIG. 1 is a perspective view showing an outline of a combination metering machine according to a first embodiment of the present invention.
Figure 2:
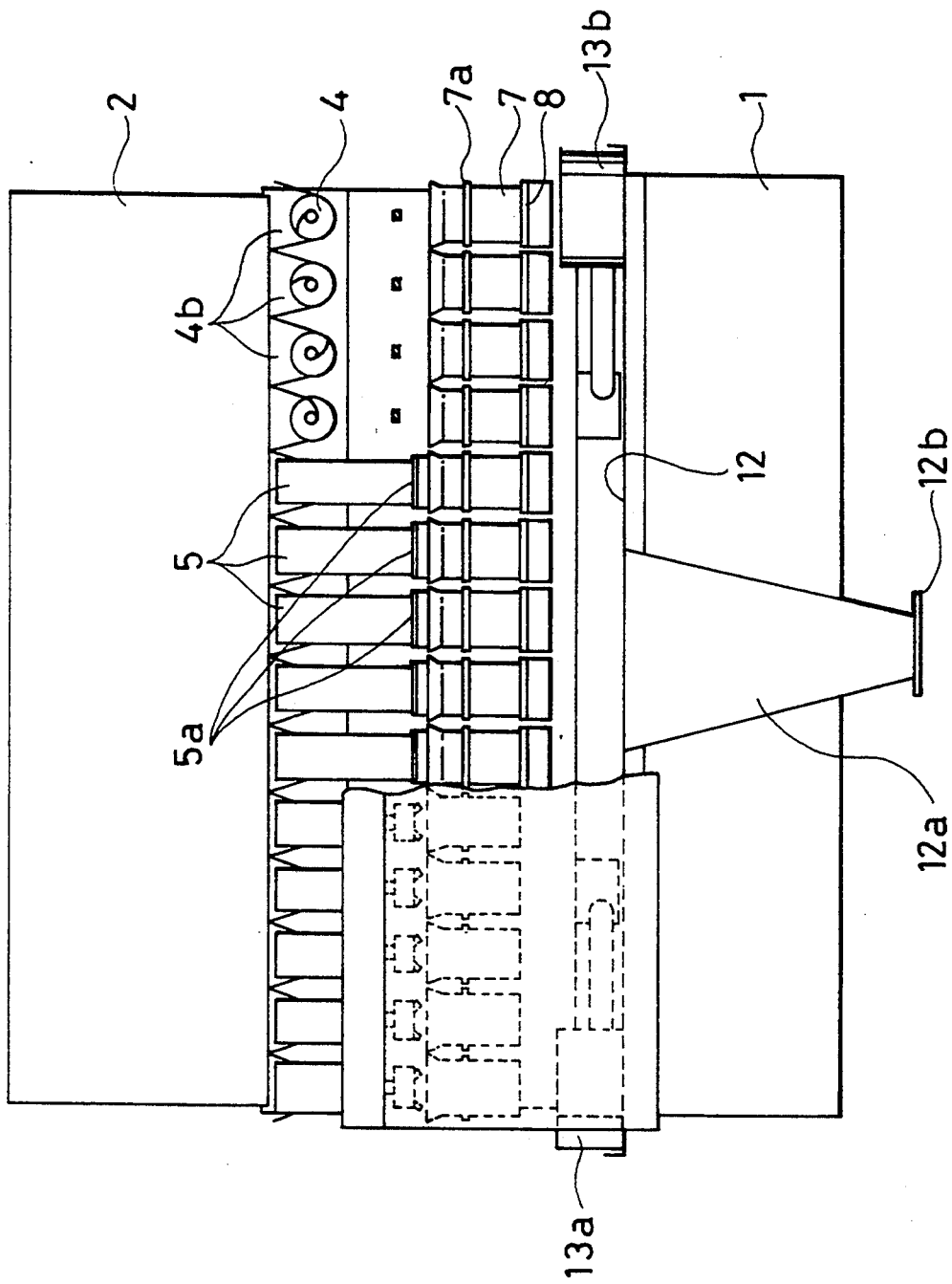
FIG. 2 is a cutaway front view of the metering machine.
Figure 3:
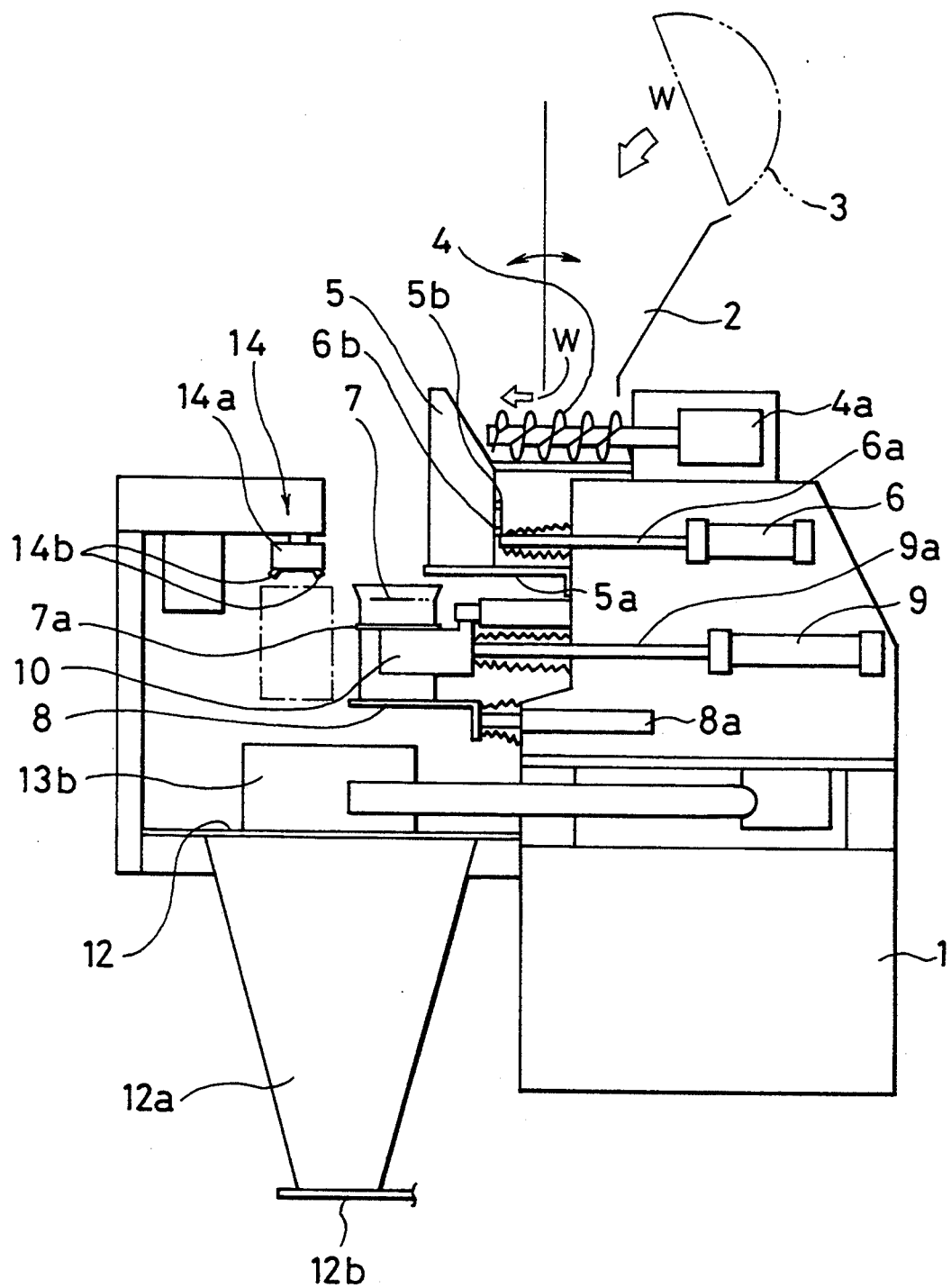
FIG. 3 is a cutaway side view of the metering machine.

FIG. 1 is a perspective view showing a combination metering machine according to a first embodiment of the present invention, FIG. 2 is a cutaway front view of the metering machine, and FIG. 3 is a cutaway side view of the metering machine.

An apparatus housing 1 is formed having a rectangular plane section.

An introduction hopper 2 having an upwardly spread top opening is provided on the top portion of the apparatus housing 1. The region over the introduction hopper 2 is used as a transfer path of a bucket lifter 3 which carries an object W of metering. The bucket lifter 3 rocks at the position over the introduction hopper 2, thereby introducing the object W of metering therein into the introduction hopper 2.

The introduction hopper 2 is horizontally elongated, and a plurality of supply/transportation screws 4 are arranged side by side under its open lower portion. The supply screws 4, which are connected individually to motors 4a provided in the housing 1, are adapted to move the object W of metering in the forward direction of the metering machine from the position under the introduction hopper 2 when they rotate.

Pool hoppers 5 are arranged individually at the positions corresponding to the respective front end portions of the supply screws 4. The pool hoppers 5 are mounted (corresponding individually to the supply screws 4) on a base plate 5a which is fixed to the housing 1.

The pool hoppers 5 have a cylindrical shape each, and their respective upper end portions are formed so as at least to reach the height of guide paths 4b of the supply screws 4. An engaging claw 5b is provided at the back of each pool hopper 5.

Cylinders 6 are arranged in the housing 1, and an engaging claw 6b provided on the front end portion of a rod 6a of each cylinder 6 engages the engaging claw 5b of each corresponding pool hopper 5.

A plurality of cylindrical metering hoppers 7 are arranged individually under the respective front ends of the pool hoppers 5. The metering hoppers 7, which are located corresponding individually to the pool hoppers 5, are mounted on base plates 8 independent of one another. The base plates 8 are connected individually to metering load cells 8a arranged in the housing 1. The metering load cells 8a are used to weigh the object W of metering in the metering hoppers 7, as mentioned later.

A retaining ring 7a is provided around each metering hopper 7. Further, cylinders 9 are arranged in the housing 1, and an arm 10 attached to the front end portion of a rod 9a of each cylinder 9 can hold each corresponding metering hopper 7.

Referring now to the partial plan views of FIGS. 4A and 4B, the holding operation of the arm 10 for the metering hopper 7 will be described.

The distal end portion of the rod 9a has a T-shaped plane configuration, and the respective central portions of symmetrical L-shaped arm portions 10a and 10b are fixed individually to the opposite end portions of the rod 9a for rocking motion. These arm portions 10a and 10b are continually urged to close by means of a spring 10d.

Meanwhile, the housing 1 is provided with a stationary engaging piece 11.

Figure 4A:
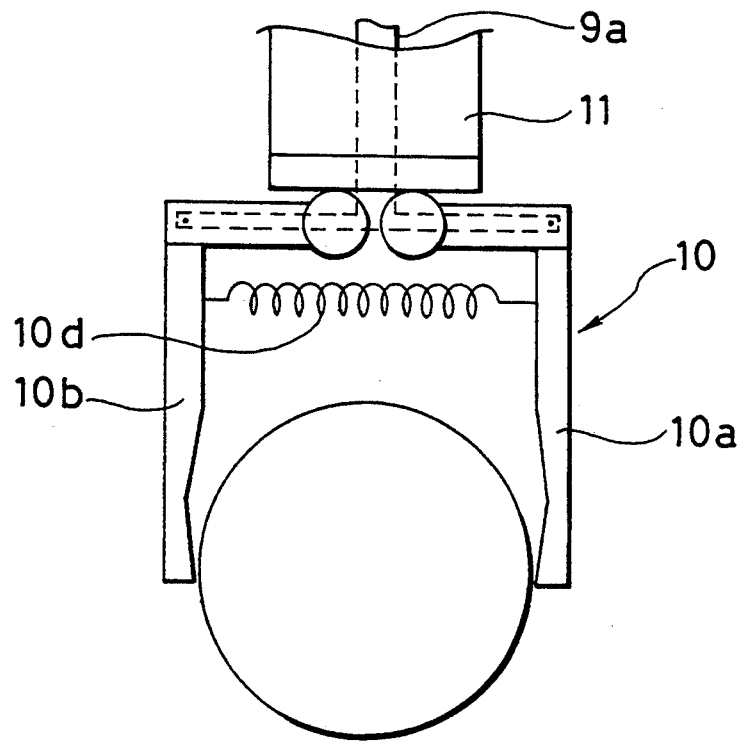
FIG. 4A is a partial plan view showing an arm.

When the cylinder 9 is in a contracted state, the metering hopper 7 is on the base plate 8, and one end of each of the arm portions 10a and 10b abuts against the engaging piece 11, so that the arm portions 10a and 10b are open, as shown in FIG. 4A. In this state, the weight value of the object W of metering in the metering hopper 7, along with the respective weights of the metering hopper 7 itself and the base plate 8, is measured by means of the metering load cell 8a. The respective weights of the metering hopper 7 and the base plate 8 are subjected to electrical zero-correction in advance.

Figure 4B:
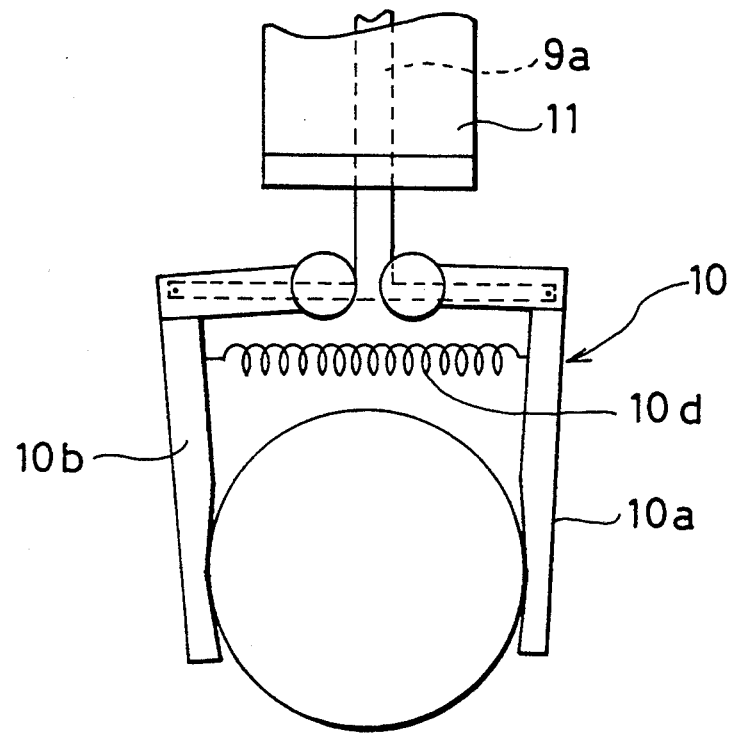
FIG. 4B is a partial plan view illustrating the operation of the arm.

When the cylinder 9 is in an extended state, on the other hand, the arm portions 10a and 10b are disengaged and freed from the engaging piece 11, and grasp the metering hopper 7, as shown in FIG. 4B. As the cylinder 9 further extends, the metering hopper 7 is disengaged from the upper surface of the base plate 8, so that the object W of metering drops downward.

Discharge aid means 14 is located in an upper position to which the metering hopper 7 projects forward. The discharge aid means 14 is composed of a circular rotating body 14a, having a diameter not larger than the diameter of an inner cylinder of the metering hopper 7, and air nozzles 14b for jetting high-pressure air toward the inner cylinder of the metering hopper 7. The rotating body 14a is rotated by means of a motor, and the air nozzle 14b is connected with a high-pressure air source. Thus, when the metering hopper 7 projects forward, as shown in FIG. 3, after weighing the metering hopper 7 is finished, the object W of metering therein can be securely exhaustively dropped downward through the operation of the discharge aid means 14. With use of this discharge aid means 14, in particular, the sticky object W of metering can be weighed accurately and precisely.

A flat collecting plate 12 is disposed under these individual metering hoppers 7. A scraper 13 for scraping up the object W of metering on the collecting plate 12 to the central portion is arranged on the collecting plate 12.

The scraper 13 is composed of a pair of rocking arms 13a and 13b, left and right. As their respective rocking-center portions in the housing 1 are driven, these rocking arms 13a and 13b scrape up the object W of metering dropped from the individual metering hoppers 7, and drop it through a collecting chute 12a in the center, as shown in the partial plan view of FIG. 5. The length and rocking center positions of the rocking arms 13a and 13b are determined in advance so that so that the batches of the object w of metering dropped from any of the metering hoppers 7 can be scraped up as illustrated.

Further, a discharge gate 12b is disposed under the collecting chute 12a, through which the object can be discharged onto a conveyor or the like for delivery to the next stage.

The following is a description of combination metering operation of the combination metering machine constructed in this manner.

First, the bucket lifter 3, loaded with the object W of metering, moves to its top position with a predetermined timing and then rocks to introduce the object W of metering therein into the introduction hopper 2, in order that the introduction hopper 2 is always stored with a predetermined quantity of the object W of metering.

Then, the object W of metering is moved from the position under the introduction hopper 2 into the pool hoppers 5 by means of the supply screws 4. Each pool hopper 5 is always supplied with a predetermined quantity of the object W of metering large enough to fill the capacity of the pool hopper 5 by means of its corresponding supply screw 4.

Then, the predetermined quantity of the object W of metering in the pool hoppers 5 is transferred to the metering hoppers 7 through the operation of the cylinders 6. The supply screws 4 are stopped from rotating while the pool hoppers 5 are projected.

The object w of metering in each metering hopper 7 is weighed by means of each corresponding metering load cell 8a, and the resulting value is stored in a control section (see FIG. 27).

The control section selects the metering hoppers 7 in a combination corresponding to the weight previously determined by an operator, whereby the cylinders 9 corresponding to the selected metering hoppers 7 operate to drop all these batches of the object W of metering onto the collecting plate 12.

The total weight of the dropped object W of metering is the final combined weight. After the object is scraped up by means of the scraper 13, it is discharged through the discharge gate 12b and delivered to the next process, such as bagging.

In cleaning this combination metering machine, the pool hoppers 5 can be easily removed by disengaging the engaging claws 5b, and the metering hoppers 7, which are free from the arms 10, can be also easily removed.

Further, each of the pool hoppers 5 and the metering hoppers 7 has a simple barrel-shaped structure, and can be cleaned easily and securely by washing or the like, only using a barrel-shaped brush or the like.

Since all the hoppers are arranged in a line along the front face of the apparatus, moreover, mechanical maintenance and cleaning operation for the whole apparatus can be facilitated.

Figure 6:
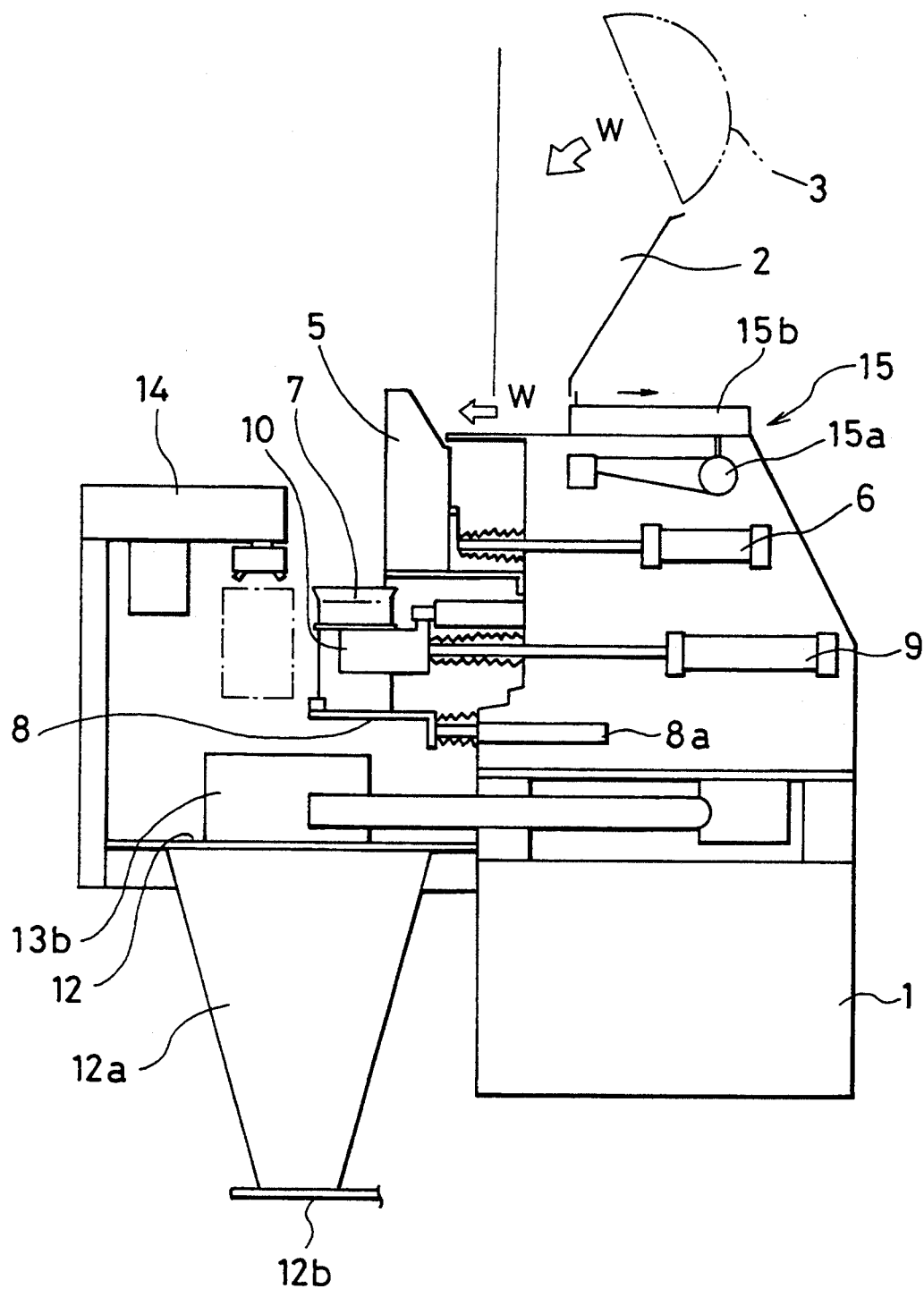
FIG. 6 is a cutaway side view showing a modification of the first embodiment of the present invention.

The supply screw 4 described in connection with the above embodiment may be replaced with ejection mechanisms 15 shown in the cutaway side view of FIG. 6. Each ejection mechanism 15 is arranged so that a pusher 15b can be slid by means of the driving force of a reciprocating mechanism 15a, whereby the object W of metering discharged from under the introduction hopper 2 can be supplied to the pool hoppers 5 in the same manner as in the aforementioned embodiment.

Figure 7:
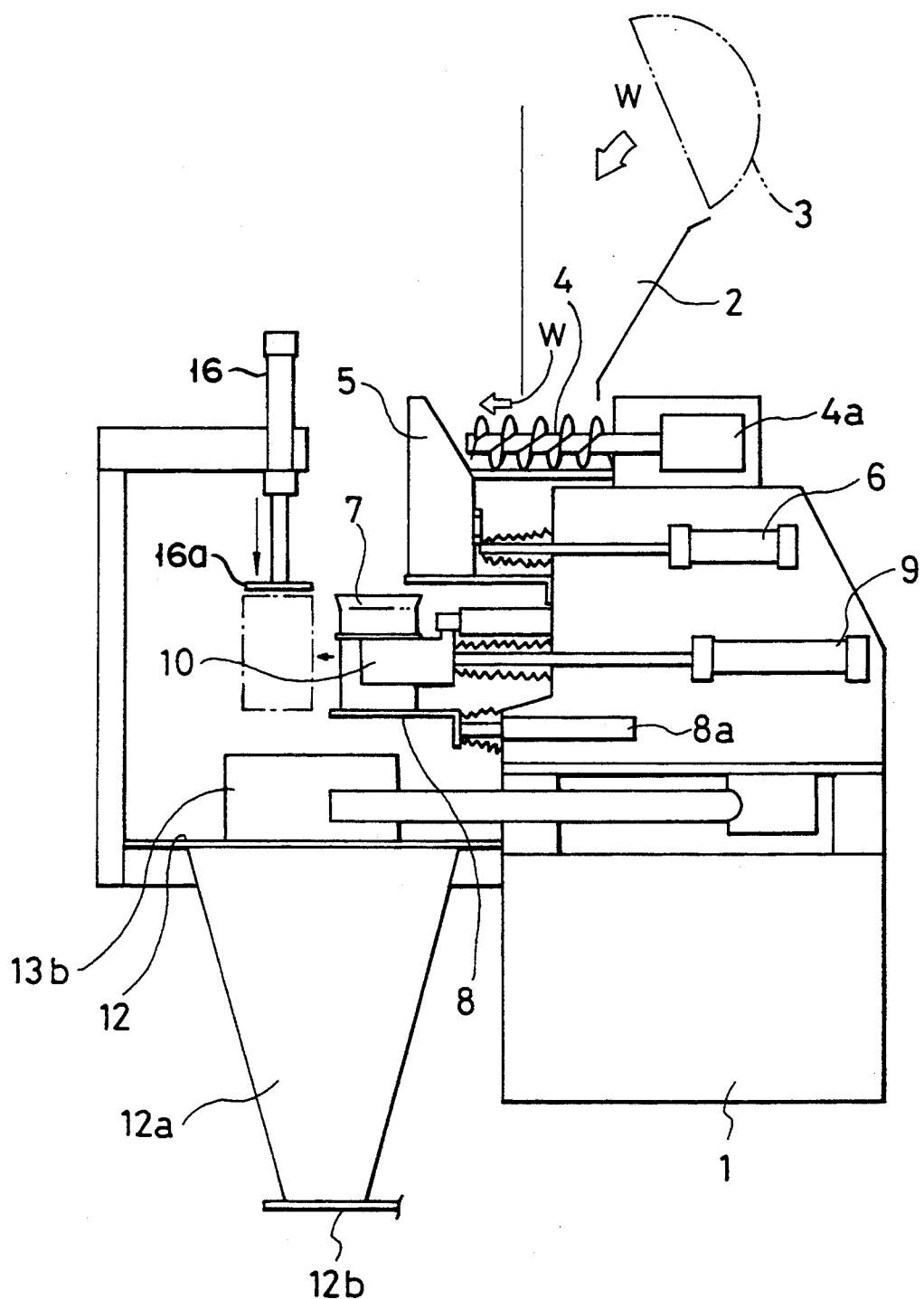
FIG. 7 is a cutaway side view showing another modification of the first embodiment of the present invention.

As an alternative example of the discharge aid means described in connection with the foregoing embodiment, moreover, an arrangement may be used such that a rod of a fixed cylinder 16 is provided with a disk-shaped cup 16a having a diameter not larger than the diameter of the inner cylinder of each metering hopper 7, as shown in the cutaway side view of FIG. 7.

In this case, when the metering hopper 7 projects forward after weighing the metering hopper 7 is finished, the object W of metering therein can be securely exhaustively dropped downward through the operation of the discharge aid means. As in the case of the foregoing embodiment, therefore, weighing the sticky object W of metering can be made accurate.

Figure 8:
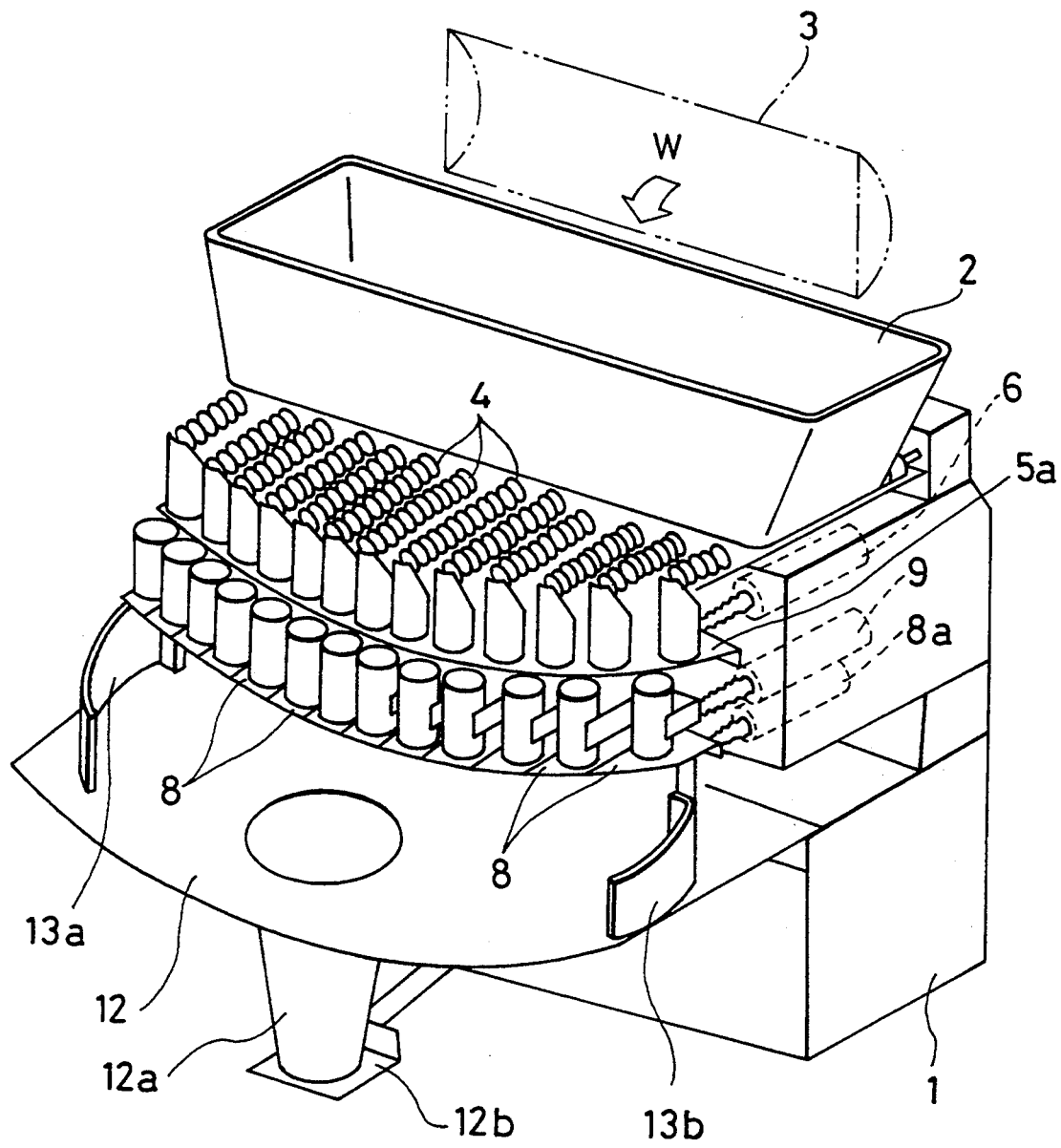
FIG. 8 is a perspective view showing still another modification.

As shown in the perspective view of FIG. 8, furthermore, the base plate 5a of the pool hoppers 5, the base plates 8 of the metering hoppers 7, and the front portion of the collecting plate 12 may be formed each in the shape of a circular arc having a predetermined curvature, such as a semicircle, ellipse, etc.

Figure 9:
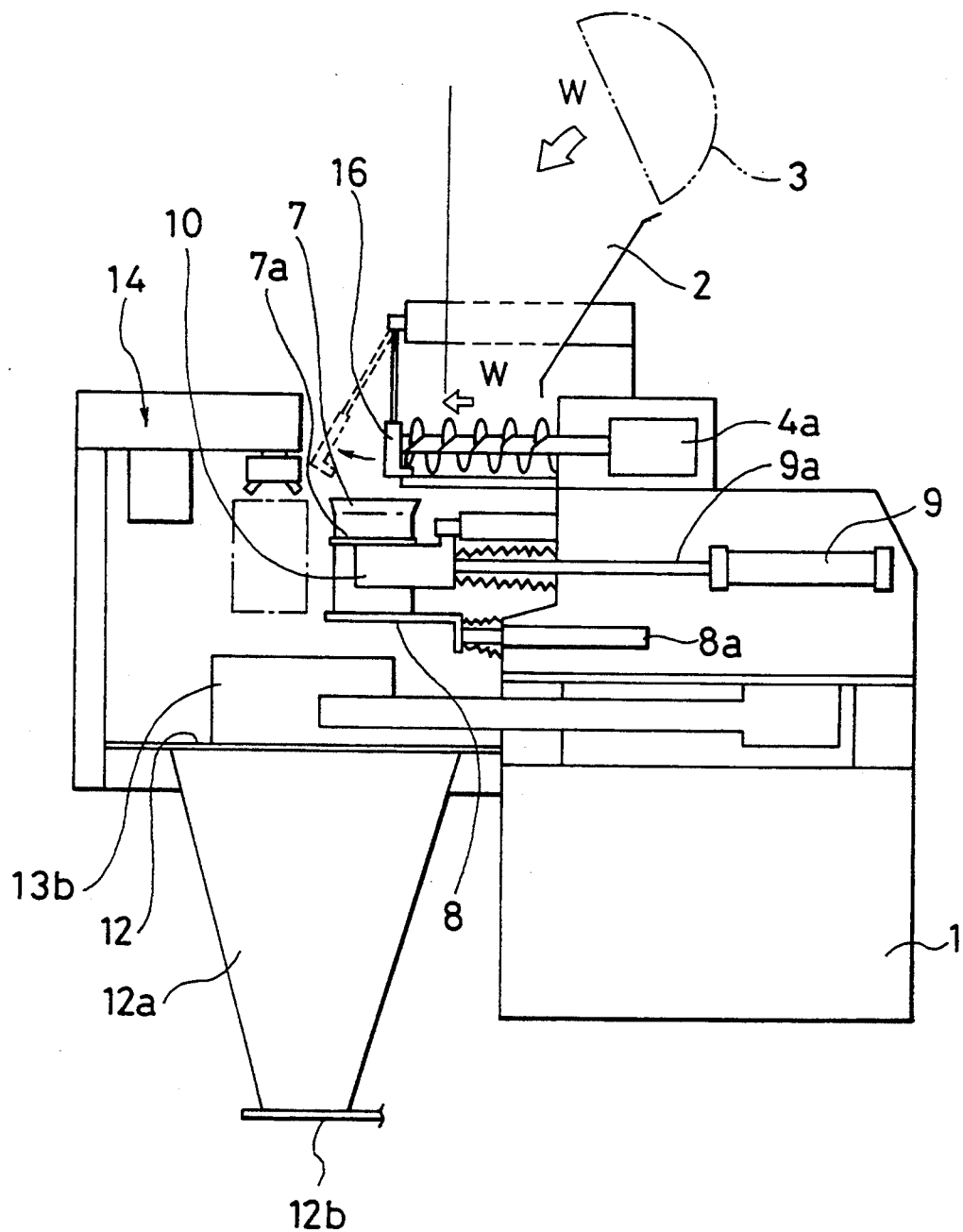
FIG. 9 is a cutaway side view of a further modification.

As shown in the cutaway side view of FIG. 9, moreover, the metering hoppers 7 may be arranged under the respective end portions of the supply screws 4 without the use of the pool hoppers 5, and a swingable shutter 16 may be disposed at the respective end portions of the supply screws 4. As this shutter 16 is closed when the supply screws 4 are stopped, the object W of metering is prevented from dropping into the metering hoppers 7.

Figure 10A:
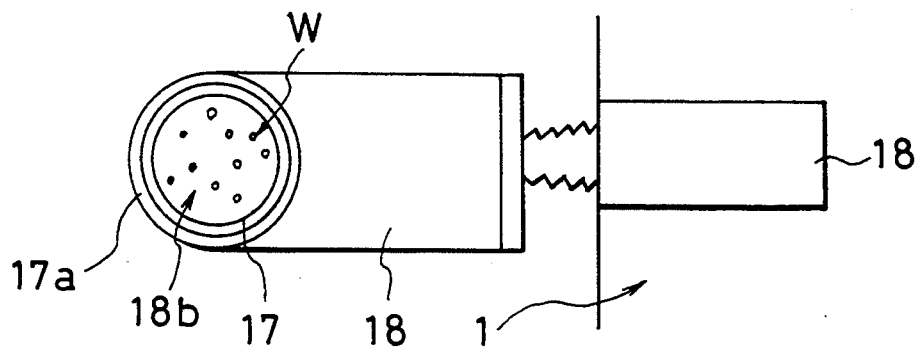
FIG. 10A is a partial plan view showing a modification of a metering hopper.
Figure 10B:
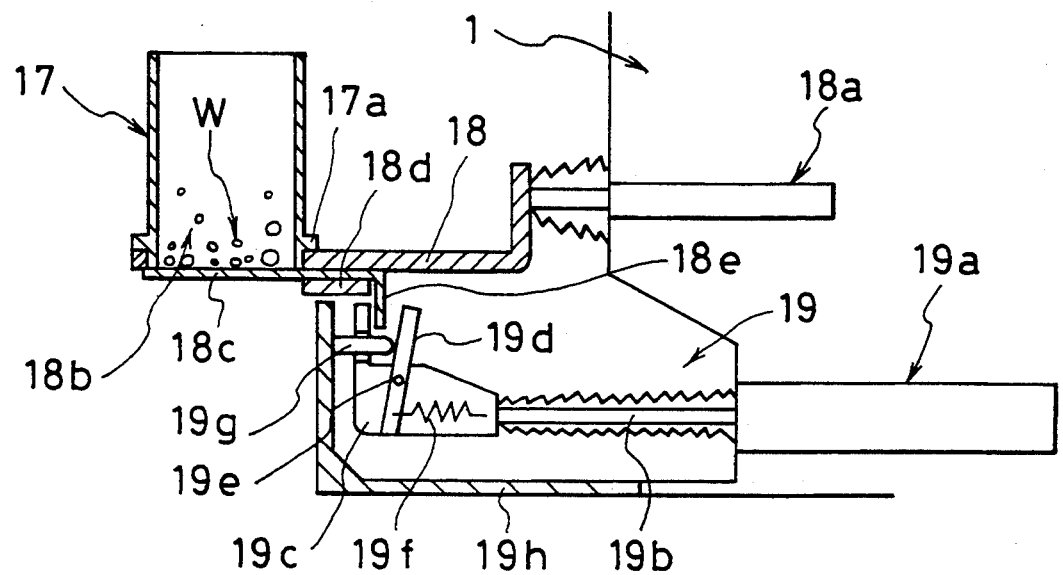
FIG. 10B is a cutaway side view of the same modification.
Figure 10C:
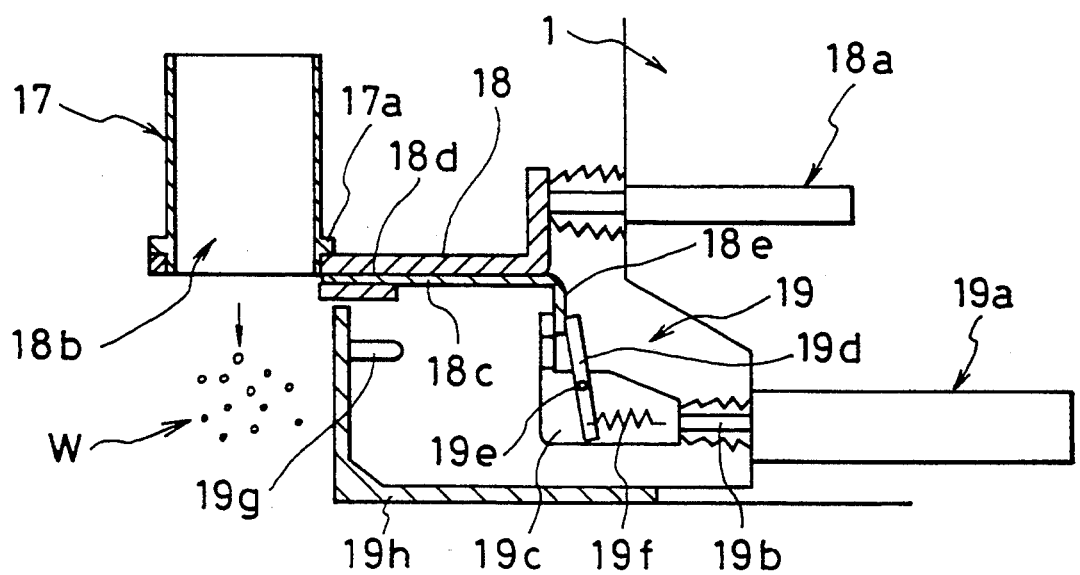
FIG. 10C is a cutaway side view showing an operating state.

FIG. 10A is a partial plan view showing a modification of the metering hopper 7, FIG. 10B is a cutaway side view of the same modification, and FIG. 10C is a cutaway side view showing an operating state.

A retaining protrusion 17a is provided around the bottom portion of a barrel-shaped metering hopper 17. The retaining protrusion 17a is placed on a retaining plate 18. The retaining plate 18 has an opening portion 18b corresponding to the outside diameter of the metering hopper 17, and the metering hopper 17 is mounted on the retaining plate 18 in a manner such that the retaining protrusion 17a engages the opening portion 18b.

A slide plate 18c is disposed under the opening portion 18b of the retaining plate 18. The slide plate 18c, which is held by means of a holding plate 18d under the retaining plate 18, is slidable toward the opening portion 18b, and has a downwardly bent engaging piece 18e.

The slide plate 18c is connected to a metering load cell 18a which is located in the housing 1. The metering load cell 18a weighs the object W of metering in the metering hopper 17.

The slide plate 18c is moved by means of a slide mechanism 19 which is located in a lower position. The slide mechanism 19 has a cylinder 19a as a drive source in the housing 1, and an engaging portion 19c is provided at the distal end portion of a rod 19b.

The engaging portion 19c engages the engaging piece 18e of the slide plate 18c. The engaging portion 19c is provided with a holding piece 19d arranged on the opposite face side with the engaging piece 18e between them. The holding piece 19d is continually urged to rock around a pivot 19e toward the engaging portion 19c by means of a spring 19f at the lower portion.

When the rod 19b is actuated to locate the slide plate 18c right under the opening portion 18b, a fixed release rod 19g abuts against the holding piece 19d. The release rod 19g is fixed to a supporting portion 19h which protrudes from the housing 1.

According to this arrangement, the engaging piece 18e of the slide plate 18c is held between the holding piece 19d and the urged holding portion 19c. When the rod 19b of the cylinder 19a extends in this state, the slide plate 18c slides toward the region under the opening portion 18b.

When the slide plate 18c is located right under the opening portion 18b, as shown in FIG. 10B, the fixed release rod 19g abuts against the holding piece 19d. As a result, the engaging piece 18e, held between the holding portion 19c and the holding piece 19d, is released from the fixed state, so that the slide plate 18c is held by means of the retaining plate 18 only.

Thereafter, the object W of metering introduced into the metering hopper 17 is temporarily held on the slide plate 18c, and is weighed by means of the metering load cell 18a. The metering load cell 18a can weigh the object in a manner such that the components of the slid mechanism 19 are detached.

When the rod 19c contracts, as shown in FIG. 10C, the slide plate 18c leaves the opening portion 18b to discharge the object w of metering onto the collecting plate 12 thereunder.

At this time, holding piece 19d is disengaged from the release rod 19g, so that the slide plate 18c is retreated from the opening portion 18b with the engaging piece 18e fixed between the holding portion 19c and the holding piece 19d.

The metering hopper 17, which is mounted on the holding plate 18, can be easily removed and cleaned.

Figure 11:
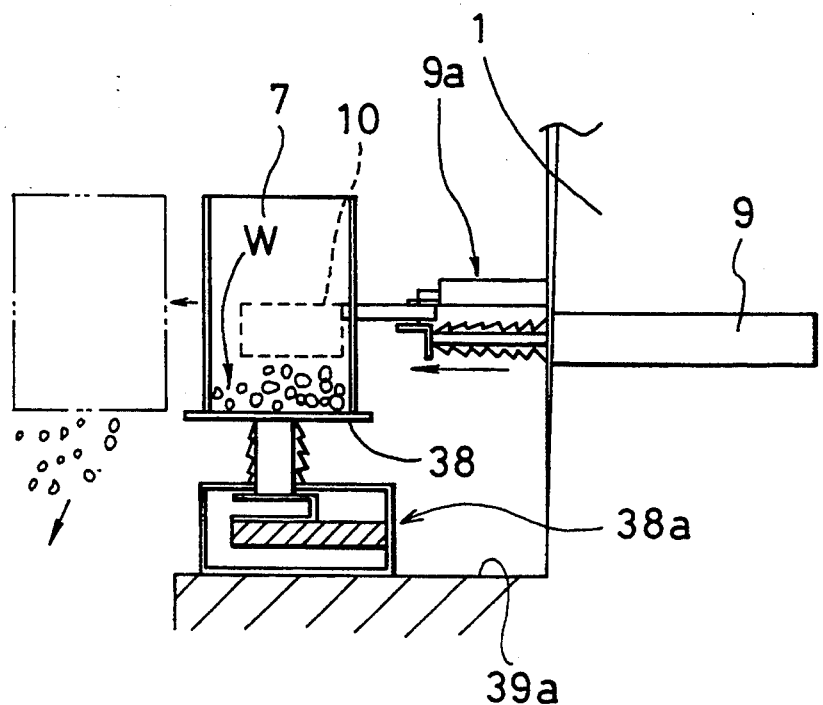
FIG. 11 is a cutaway side view showing another modification of the metering hopper.

FIG. 11 is a cutaway side view showing another modification of the metering hopper 7.

In this modification, a metering load cell 38a is located right under the metering hopper 37. In the embodiment described above, the metering load cell 8a is arranged horizontally, and serves to measure the vertical weight. In the case of this arrangement, however, the metering load cell 8a is liable to be subjected to a vertical force, so that it may possibly be overloaded and damaged at the time of maintenance or the like.

In this modification, therefore, the metering load cell 38a is arranged on a horizontal pedestal portion 39a, which constitutes part of the housing 1, and a retaining plate 38 for weighing the object W of metering is disposed on the top of the load cell, whereby weight from above is measured, as shown in FIG. 11.

As the cylinder 9 and the arm portions 10a and 10b are actuated in the aforementioned manner, the metering hopper 7 is moved from the position on the retaining plate 38 to the position indicated by chain line in FIG. 11, whereupon it discharges the object W of metering.

Also according to this modified example of arrangement, the same functions and effects of the above embodiments can be obtained, and the durability of the metering load cell 38a can be improved.

Figure 12:
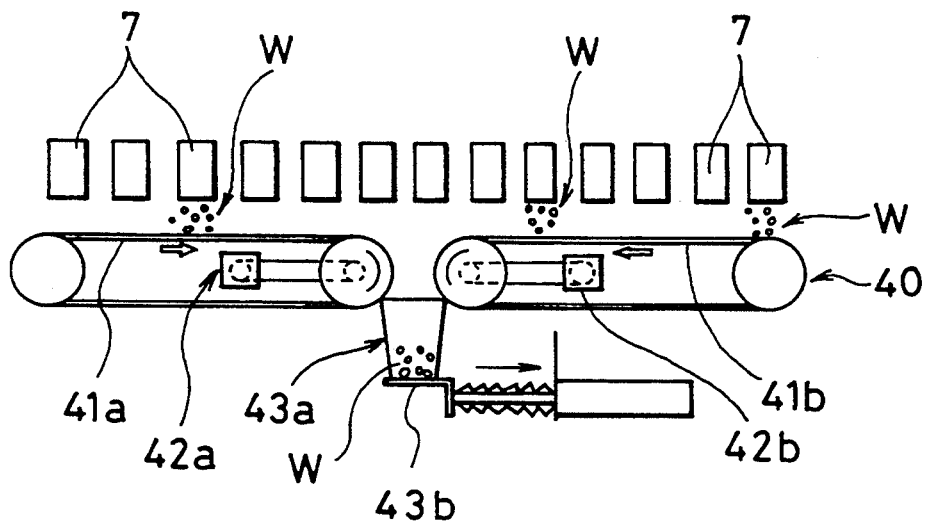
FIG. 12 is a cutaway front view showing a modification of a scraper portion.

FIG. 12 is a cutaway front view showing a modification of the portion corresponding to the scraper 13 of the foregoing embodiment. A collecting device 40 is provided, in place of the collecting plate 12 and the scraper 13, under the individual metering hoppers 7.

The collecting device 40 includes a pair of conveyors 41a and 41b arranged in the same direction as the in-line arrangement of the metering hoppers 7. These conveyors 41a and 41b are transported toward the collecting chute 12a in the central portion by means of drive motors 42a and 42b, respectively. The conveyors 41a and 41b are made of cloth or steel.

The object W of metering discharged from the metering hoppers 7 is placed on the conveyors 41a and 41b, and the drive motors 42a and 42b are driven to collect the object in a collecting chute 43a in the center of the apparatus. Since the object W of metering can be automatically collected in the collecting chute 43a by means of the conveyors 41a and 41b, the collecting chute 43a can be reduced in size as illustrated.

Also according to the present modification, the same functions and effects of the scraper 13 of the foregoing embodiment can be obtained, and the object W of metering can be collected without being damaged.

A discharge gate 44b is provided under the collecting chute 43a, and the collected object W of metering is discharged onto a conveyor or the like for delivery to the next stage.

Figure 13:
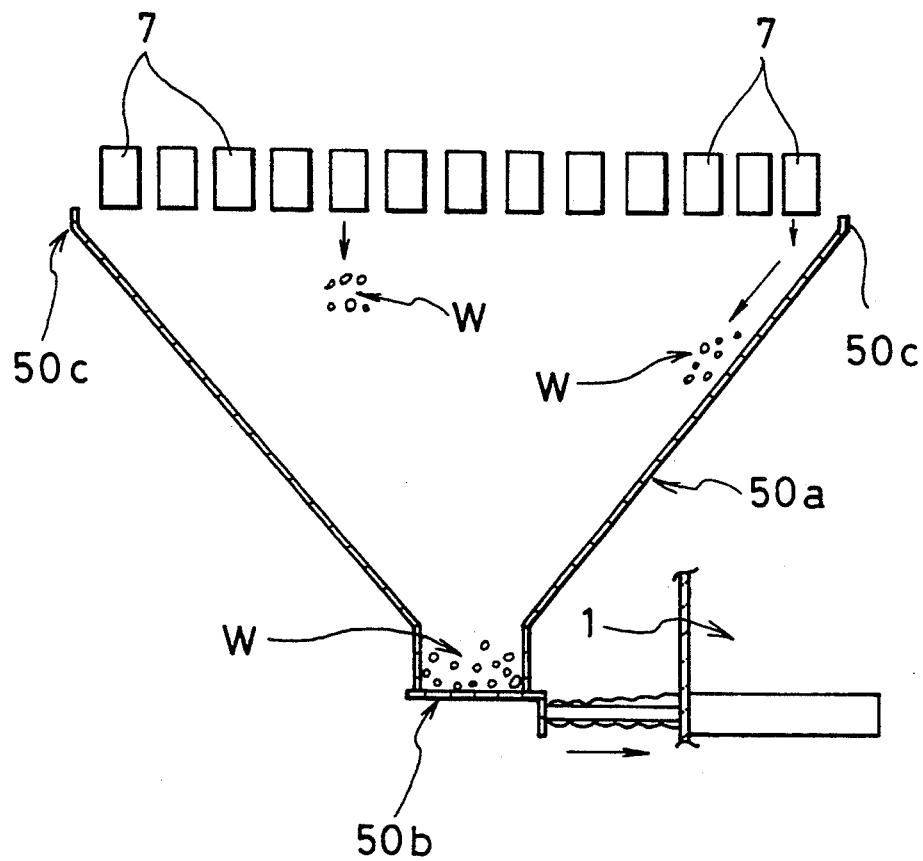
FIG. 13 is a cutaway front view showing a modification of a collecting chute.

FIG. 13 is a cutaway front view showing a modification of the collecting chute 12a of the foregoing embodiment.

As shown in FIG. 13, a collecting chute 50a has its opening edge portion 50c spread to the end position of a plurality of metering hoppers 7 which are arranged in series. Thus, the object W of metering, discharged from the metering hoppers 7, are introduced directly into the collecting chute 50a, and temporarily held on a discharge gate 50b.

According to this arrangement, the object W of metering can be collected without using the scraper 13 or collecting device 40 according to the foregoing embodiments.

Although all of the pool hoppers and the metering hoppers are cylindrical in shape according to the embodiments described above, moreover, they may alternatively be formed having a polygonal section, e.g., tetragonal, hexagonal, etc. Also in this case, the functions and effects of the foregoing embodiments can be obtained.

According to the combination metering machine of the first embodiment of the present invention, the pool hoppers, metering hoppers, and collecting chute are arranged side by side, so that they can be easily maintained.

Since the pool hoppers and the metering hoppers are barrel-shaped, moreover, they can be easily cleaned. Even a sticky object of metering, in particular, can be securely delivered to the next stage without remaining in and around the hoppers, immediately after it is accurately weighed in a short time.

Figure 14:
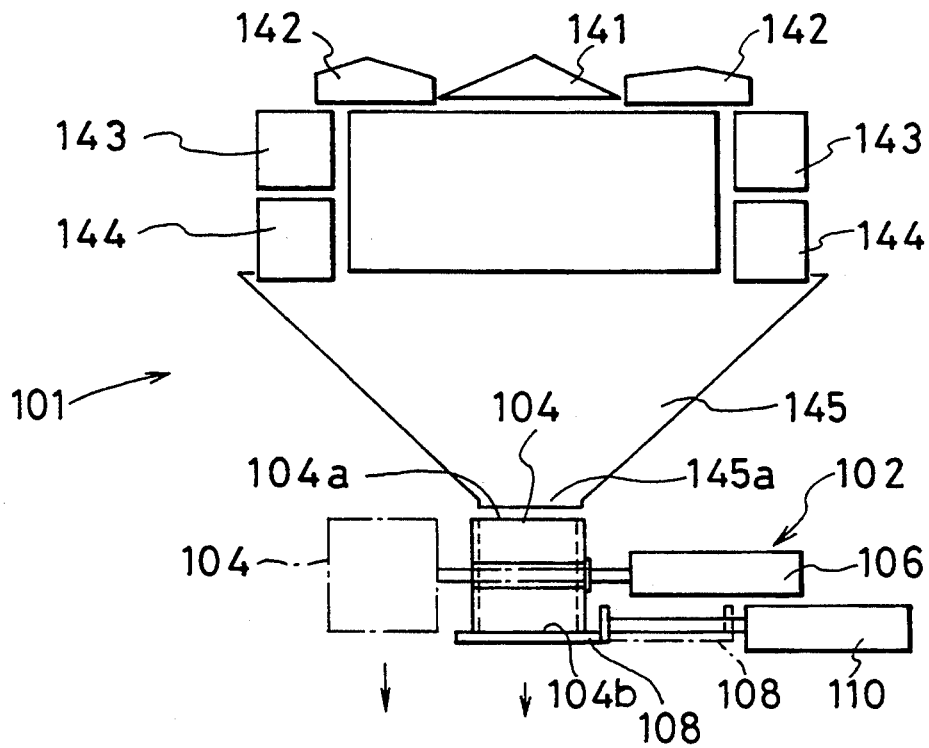
FIG. 14 is a front sectional view showing an example of a combination metering machine with a work discharge mechanism as a second embodiment of the present invention.

FIG. 14 is a front sectional view mainly showing a work discharge mechanism in a combination metering machine according to a second embodiment of the present invention. In FIG. 14, like numerals are used to designate the same components of the combination metering machine arranged having a circular plane configuration, as described in connection with the prior art, and a description of those components is omitted.

In connection with the present embodiment, moreover, a combination metering machine 101 will be described in which intermediate hoppers 143 and metering hoppers 144 are arranged substantially in a circle in parallel relation.

A collecting chute 145 is located right under the individual metering hoppers 144. The collecting chute 145 allows a predetermined quantity of work discharged from a selected one of the metering hoppers 144 to be collectively supplied to a discharge mechanism 102 through a discharge port 145a.

The discharge mechanism 102 comprises a cylindrical barrel-type container 104 having its upper and lower end portions 104a and 104b open with a diameter substantially as large as the diameter of a discharge portion 145b at the lower end portion of the collecting chute 145, an actuator 106 for moving the cylindrical container 104, a moving plate 108 for use as a plate member located right under the lower end portion 104b of the barrel-type container 104, and an actuator 110 for moving the moving plate 108.

Figure 15A:
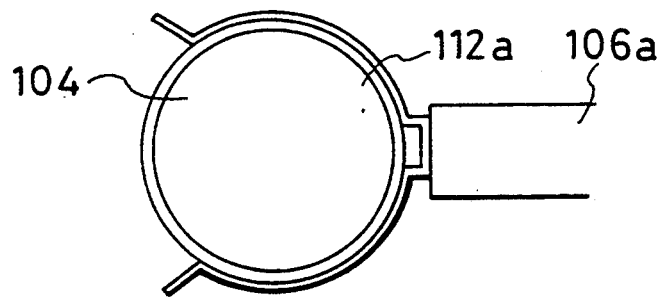
FIGS. 15A and 15B, are plan views illustrating a fixing method for a barrel-type container.
Figure 15B:
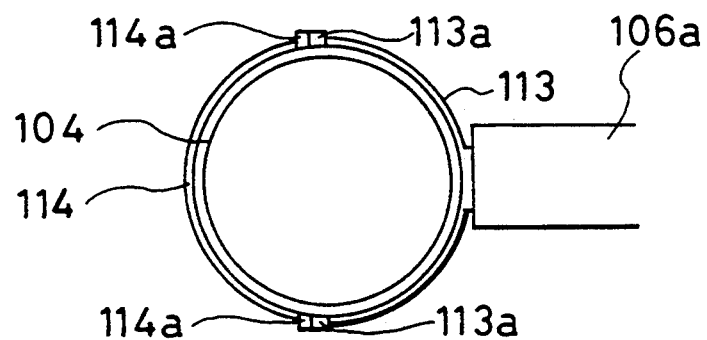

FIGS. 15A and 15B are plan views illustrating a fixing method for the barrel-type container 104.

As shown in FIG. 15A, the barrel-type container 4 can be attached to a retaining member 112a formed of a leaf spring whose outer periphery is open at one end. The retaining member 112a is fixed to a rod 106a of the actuator 106.

According to another example, as shown in FIG. 15B, the rod 106a of the actuator 106 is provided with a semicircular fixing member 113, and a retainer 113a is attached to each end of the fixing member 113. A belt 114 is wound around the barrel-type container 104, and a retainer 114a at each end of the belt 114 is caused to engage its corresponding retainer 113a, thereby fixing the barrel-type container 104 to the rod 106a.

Thus, the barrel-type container 104 can be easily attached to and detached from the apparatus body, and can be easily cleaned due to its cylindrical shape.

The following is a description of the operation of the discharge mechanism 102 constructed in this manner. If the work with a predetermined normal weight is supplied to the barrel-type container 104, the actuator 110 is operated to cause the moving plate 108 to be retreated to the position indicated by chain line in FIG. 14, and the work in the barrel-type container 104 is discharged as a conforming article to the position right under the container.

In removing a batch of the work, supplied to the barrel-type container 104, from the production line because its weight is short of the predetermined normal weight or for some other reason, on the other hand, the actuator 106 is operated to cause the barrel-type container 104 to advance to the position indicated by chain line, and the work in the barrel-type container 104 is discharged as a non-conforming article to another position beside the position for the conforming article.

Thus, the discharge position for the work can be changed depending on the state (e.g., conforming or nonconforming) of the work.

In discharging a conforming batch of the work, if any, the moving plate 108 moves in a direction such that the lower end portion 104b of the barrel-type container 104 only slides in the horizontal direction.

If the batch of the work is a non-conforming article, on the other hand, the barrel-type container 104 only slides in the horizontal direction on the moving plate 108. In either case, therefore, operating noises can be minimized.

Figure 16:
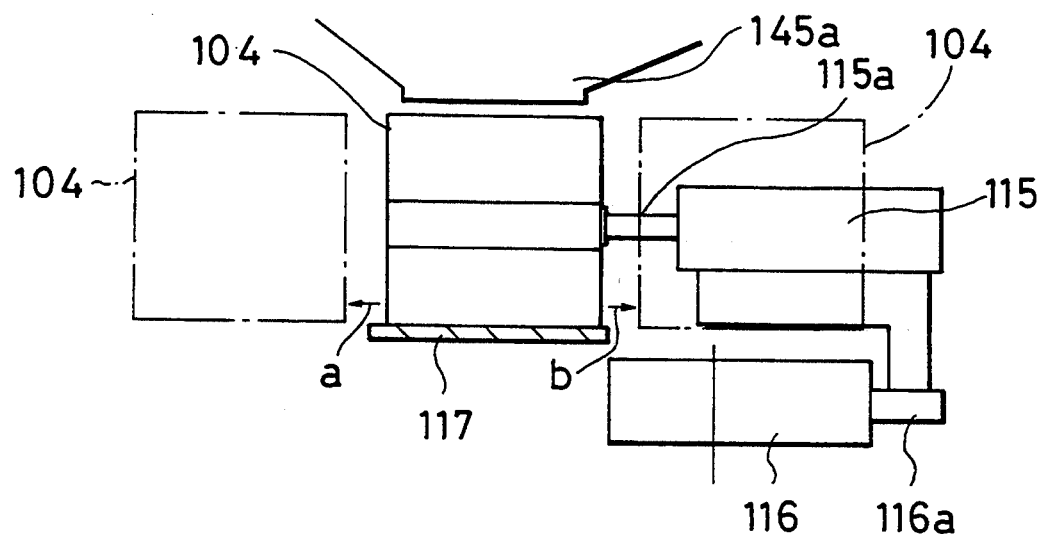
FIG. 16 is a side view showing another example of the work discharge mechanism.

FIG. 16 is a side view showing another example of the work discharge mechanism. As shown in FIG. 16, the barrel-type container 104 may be supported by means of two actuators 115 and 116, upper and lower.

The actuator 115 supports and fixes the barrel-type container 104 by means of its rod 115a, and a rod 116a of the actuator 116 supports the actuator 115.

Thus, as the actuator 115 operates, the barrel-type container 104 moves in the direction of arrow a on a fixed plate 117, for use as a plate member, thereby discharging the work. As the actuator 116 operates, the barrel-type container moves in the direction of arrow b on the moving plate 117, thereby discharging the work to another position.

Figure 17:
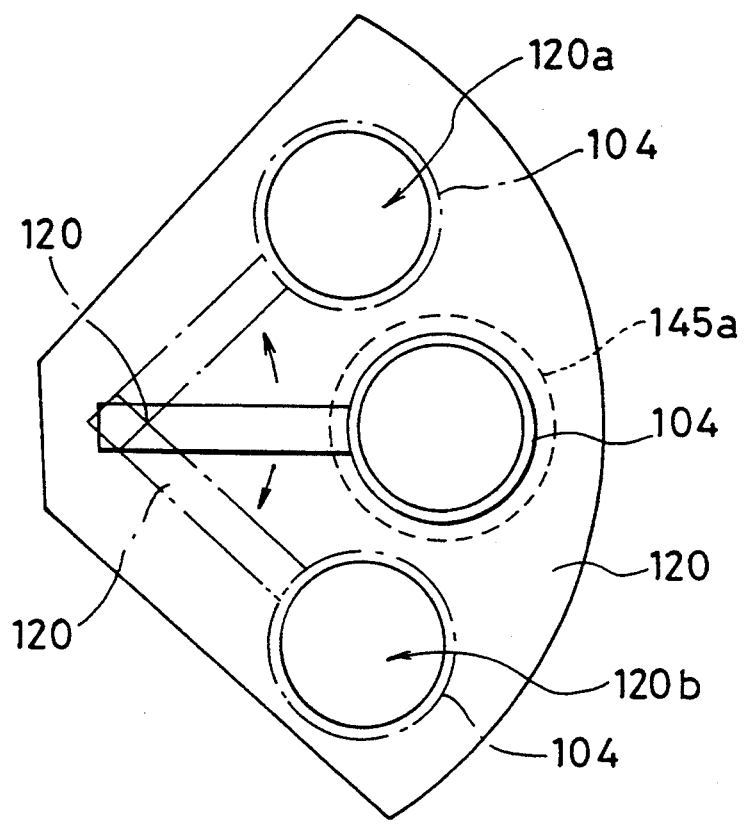
FIG. 17 is a partial plan view showing still another example of the work discharge mechanism.

FIG. 17 is a partial plan view showing still another example of the work discharge mechanism. The barrel-type container 104, which is located right under the discharge port 145a of the collecting chute 145, is fixed to one end of a swing arm 120, and alternatively horizontally moves on a fixed plate 121, for use as a plate member, from side to side as the swing arm 120 swings. Discharge ports 121a and 121b are arranged individually on both sides of the fixed plate 211. The discharge port 121a corresponds to a discharge position for conforming batches of the work, and the discharge port 121b to a discharge position for non-conforming batches of the work.

Depending on the state of the work, the swing arm 120 moves toward the discharge port 121a or 121b, thereby discharging the work to different positions.

Thus, according to this modification of the work discharge mechanism, the barrel-type container used is cylindrical in shape, and this barrel-type container is slid to a plurality of discharge positions. Also in this case, therefore, the same functions and effects of the above embodiments can be obtained.

Figure 18:
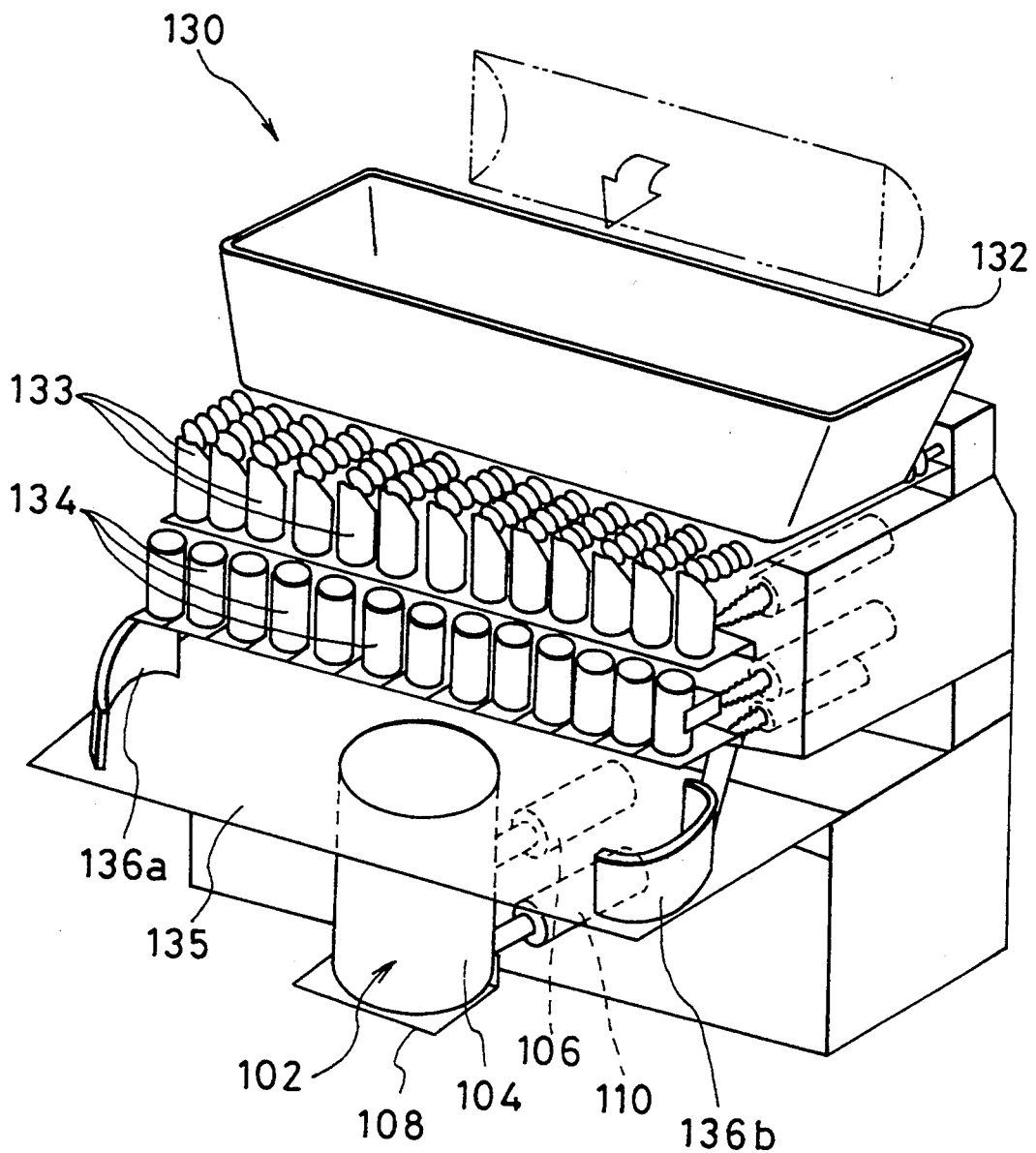
FIG. 18 is a perspective view showing another example of the combination metering machine with the work discharge mechanism.

In any of the foregoing embodiments, moreover, the work discharge mechanism is applied to the combination metering machine arranged in a circular plane configuration. Alternatively, however, the mechanism may be applied to a combination metering machine 130 shown in FIG. 18.

In this combination metering machine, a plurality of cylindrical pool hoppers 133 are linearly arranged under an introduction section 132 into which the work is introduced, and metering hoppers 134 are linearly arranged under the pool hoppers, individually. The pool hoppers 133 and the metering hoppers 134, which are all cylindrical in shape, move on plates, thereby discharging the work downward. A collecting plate 136a and collecting arms 136a and 136b are arranged under the metering hoppers 137, and the work is collected in the central portion as the collecting arms 136a and 136b operate. A discharge port 135a is bored in the central portion, and the work discharge mechanism 102 is located right under the discharge 135a.

Also this linearly arranged combination metering machine can provide the same functions and effects of the above embodiments.

According to the second embodiment of the present invention, the work contained in the barrel-type container can be discharged to different positions by moving the barrel-type container or the plate member. Thus, this embodiment may be applied to selecting operation such that conforming and non-conforming batches of work are discharged from different positions.

Since the barrel-type container is cylindrical in shape, it can be easily cleaned, and operating noises produced between the container and the plate member during the movement can be reduced.

The following is a description of a metering apparatus according to a third embodiment, in which a barrel-type container has an improved shape.

Figure 19:
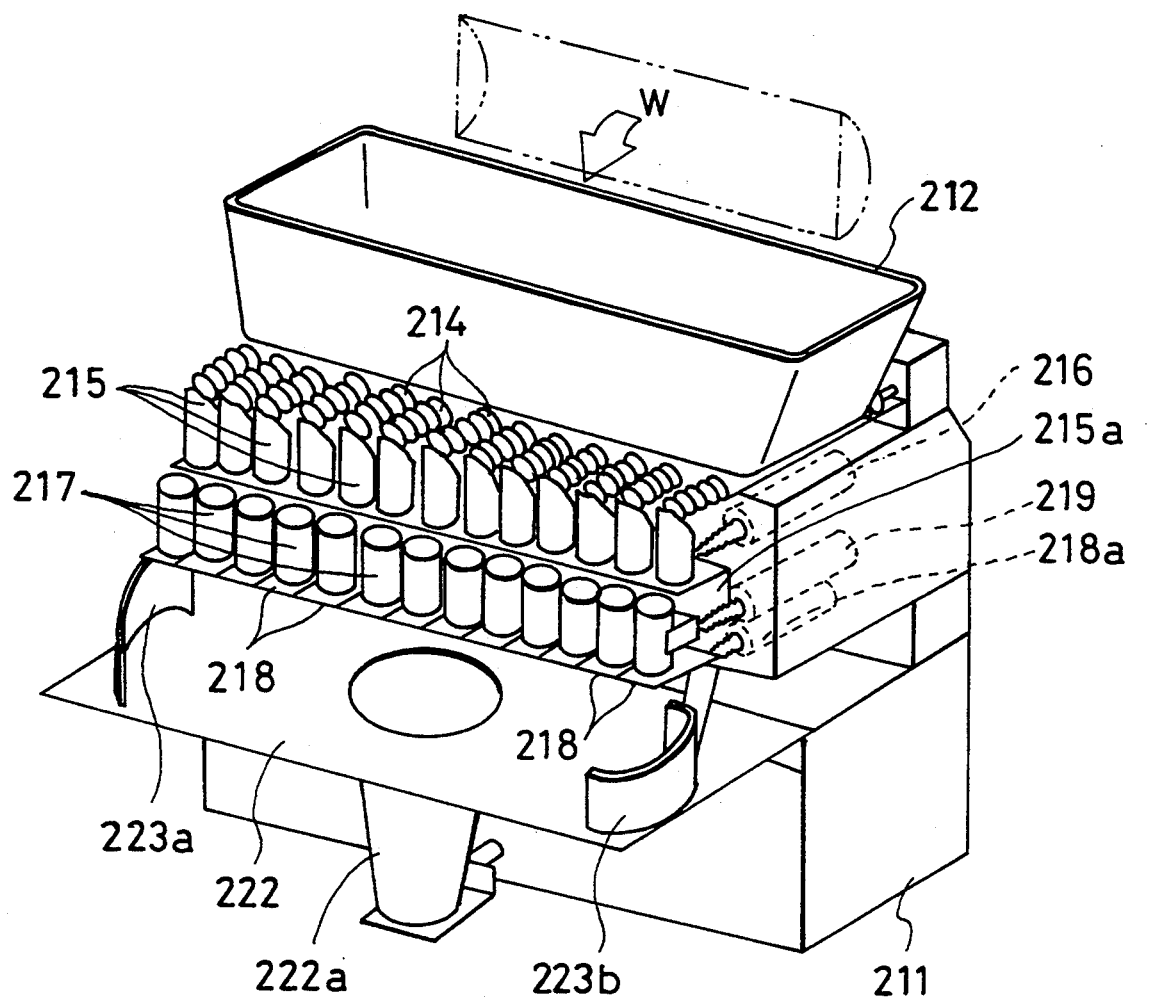
FIG. 19 is a perspective view showing a combination metering machine according to a third embodiment of the present invention.

FIG. 19 is a perspective view showing a combination metering machine according to this third embodiment.

An introduction hopper 212 having an upwardly spread top opening is provided on the top portion of an apparatus housing 211, and the object W of metering is introduced into the hopper 212.

A plurality of supply feeders 214 are arranged side by side under the introduction hopper 212. As screws rotate, the supply feeders 214 move and supply the object W of metering in the forward direction, with respect to the metering machine, from the position under the introduction hopper 212.

A plurality of cylindrical pool hoppers 215 are arranged corresponding in position to the respective front end portions of the supply feeders 214. The cylindrical pool hoppers 215 are mounted on a base plate 215a which is fixed to the housing 211. As a cylinder 216 extends, each pool hopper 215, containing the object W of metering, moves beyond the front side of the base plate 215a, thereby causing a predetermined quantity of the object W of metering to drop downward.

A plurality of cylindrical metering hoppers 217 are arranged at positions to which the object W of metering drops. The metering hoppers 217 are mounted individually on independent base plates 218. The base plates 218 are connected to metering load cells 218a arranged in the housing 211, and the metering load cells 218a weigh the object W of metering. A desired variable can be obtained by combining variables for the individual metering hoppers 217. By extending a cylinder 219, only an assigned one of the metering hoppers 217 is moved beyond the front end of each corresponding base plate 218, thereby dropping the object W of metering therein.

A flat collecting plate 222 is disposed under the metering hoppers 217. A scraper 223 for scraping up the object W of metering in the central portion is arranged on the collecting plate 222.

The object W of metering collected by means of the scraper 223 is delivered to the next stage through a collecting chute 222a.

If the object W of metering is a sticky material, in particular, and if the pool hoppers 215 and the metering hoppers 217 are mere cylindrical containers, in the combination metering machine described above, this object of metering may possibly adhere to and more or less remains on the inner wall of each hopper.

Thus, even when the pool hoppers 215 and the hoppers 217 are moved by operating the cylinders 216 and 219, some of the object W of metering in the hoppers is left adherent therein, and all the object cannot be dropped.

In the arrangement using the mere barrel-type containers as the pool hoppers 217 and the metering hoppers 217, therefore, the hoppers must be frequently cleaned, depending on the kind of the object W of metering, and the improvement of the metering accuracy of the combination metering machine itself is subject to limitation.

Figure 20A:
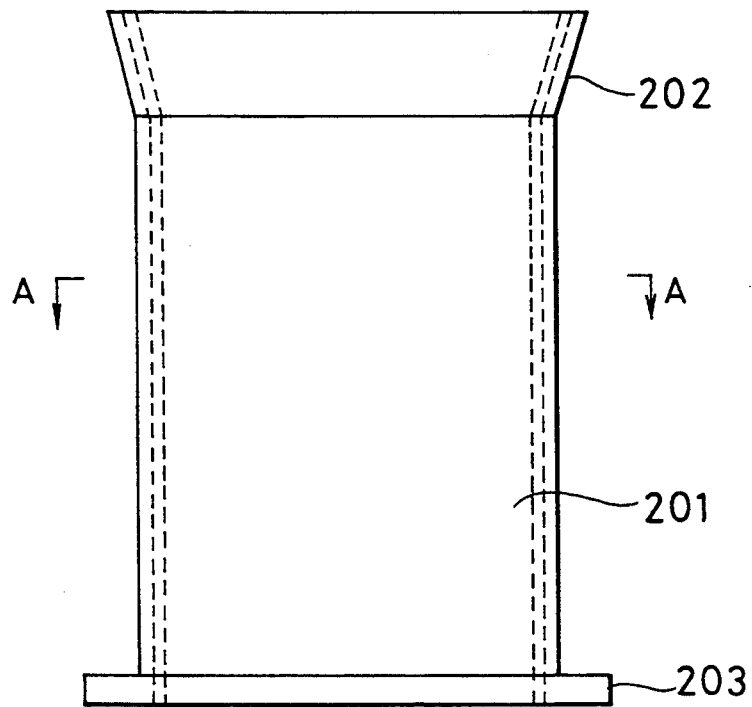
FIG. 20A is a front view showing a barrel-type container used in the third embodiment of the present invention.
Figure 20B:
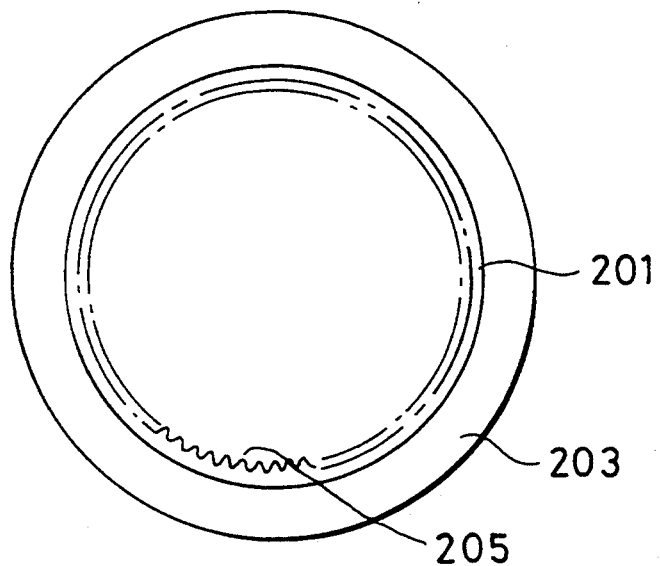
FIG. 20B is a sectional view taken along line A-A of FIG. 20A.

Accordingly, in this third embodiment, barrel-type containers improved in the manner shown in FIGS. 20A and 20B are used as the pool hoppers 215 and the metering hoppers 217 of FIG. 19.

FIG. 20A is a front view showing a barrel-type container used in the third embodiment, and FIG. 20B is a sectional view taken along line A—A of FIG. 20A.

As shown in these drawings, a container body 201 is in the form of a hollow barrel. An introduction opening portion 202 having a little larger diameter is formed at the top end portion of the container body 201, whereby the object of metering introduced from above can be prevented from scattering.

A collar portion 203 is provided at the lower end portion of the container body 201, whereby the container body 201 is supported with stability.

Further, indentations 205 are arranged on the inner peripheral wall of the container body 201.

The indentations 205 of the present embodiment are formed of vertically continuous grooves, and these groove-shaped indentations 205 are continuously arranged in a plurality of rows on the inner peripheral wall, as shown in FIG. 20B.

Figure 20C:
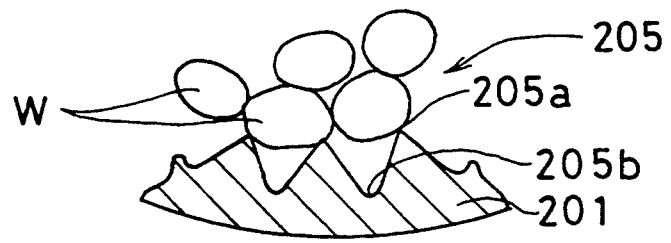
FIG. 20C is a partial enlarged view showing indentations of the barrel-type container.

As shown in the partial enlarged view of FIG. 20C, each indentation 205 has a triangular section, its vertex portion 205a is formed at a predetermined acute angle, and its base portion 205b is in contact with the base portion of its adjacent indentation 205 at an obtuse angle.

This container body 201 is applied to the pool hoppers 215 and the metering hoppers 217 in the combination metering machine described with reference to FIG. 19.

Thus, the object W of metering is contained in point contact with the indentations of the container body 201. Accordingly, the object W of metering never adheres to the container body 201, and at the time of discharge, all the object W of metering contained can be dropped and discharged.

Thus, the container body 201 can be cleaned with ease. Further, the metering accuracy of the combination metering machine can be improved.

Although the indentations are formed of the vertically continuous triangular grooves in the embodiment described above, they are not limited to the triangular shape, and the same functions and effects can be obtained only if the indentations have a shape such that they are in point contact with the object of metering.

Combination metering machines to which the container body 201 can be applied include a combination metering machine with a flat circular shape, in which a conical feeder is provided at the upper central portion of the metering machine, and pool hoppers and metering hoppers are radially arranged in succession, the former overlying the latter, as well as the type in which the pool hoppers 215 and the metering hoppers 217 are linearly arranged in one direction, as shown in FIG. 19. Also in this case, the same functions and effects of the above embodiments can be obtained.

According to the third embodiment of the present invention, a plurality of indentations are arranged on the inner peripheral wall of the container body of the barrel-type container used therein, so that the introduced object W of metering is contained in point contact with the indentations. At the time of discharge, therefore, all the object of metering contained can be discharged, and cleaning can be easily effected even if the object of metering is sticky, in particular.

After the object of metering is weighed, moreover, all the object of metering can be discharged, so that the metering accuracy can be improved. In the first embodiment mentioned before, the object of metering is easily discharged in a short time by the following method. According to this method, a metering container placed on the upper surface of a metering base is formed in the shape of a cylinder open at its top and bottom ends. In discharging the object of metering in the metering container after the weighing, a mechanism is used such that the metering container is slid on the upper surface of the metering base so that it slips off this upper surface, whereby the object of metering is dropped downward through the bottom opening.

In discharging an object of metering for bagging from the metering container, therefore, the object of metering automatically drops downward if the metering container is horizontally moved and pushed out of the upper surface of the metering base, so that the combination processing efficiency of the whole combination metering apparatus increases.

However, even the metering container of the metering machine constructed in this manner still has the following problem to be considered.

If the object of metering contained in the metering container is an article such as wrapped candy or dried peanuts, all the article in the metering container can be dropped through the bottom opening by slidingly pushing the metering container out of the metering base.

However, a sticky material, such as pickled vegetables, or a highly watery material may more or less stick to the inner peripheral surface of the metering container, in some cases, even though it can be discharged in a short time.

Figure 21:
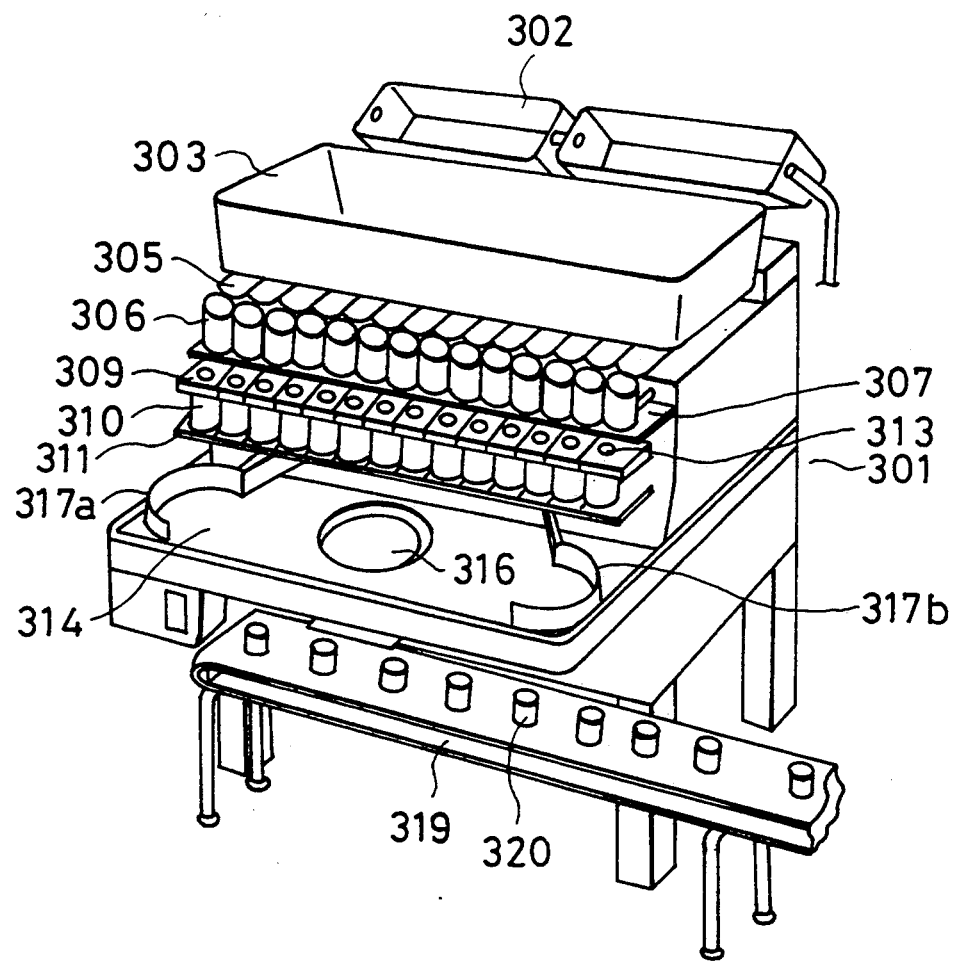
FIG. 21 is a perspective view showing a combination metering apparatus according to a fourth embodiment of the present invention.
Figure 22:
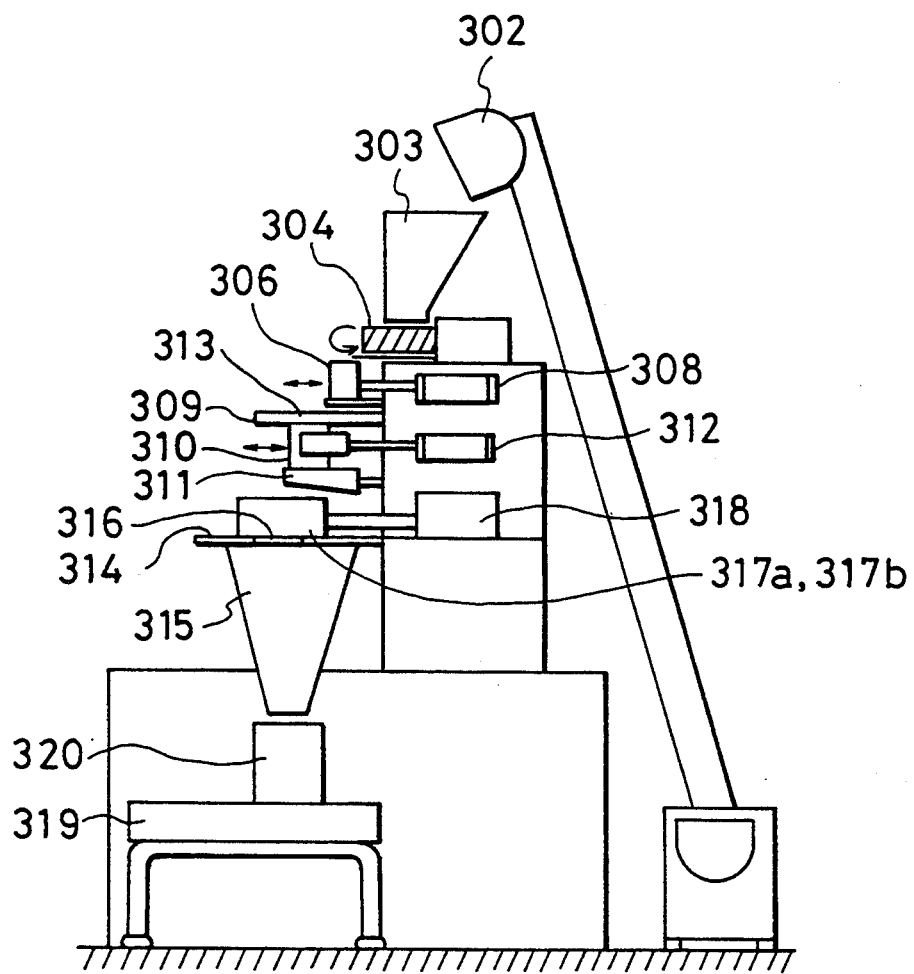
FIG. 22 is a diagrammatic sectional view of the combination metering apparatus of FIG. 21.
Figure 23:
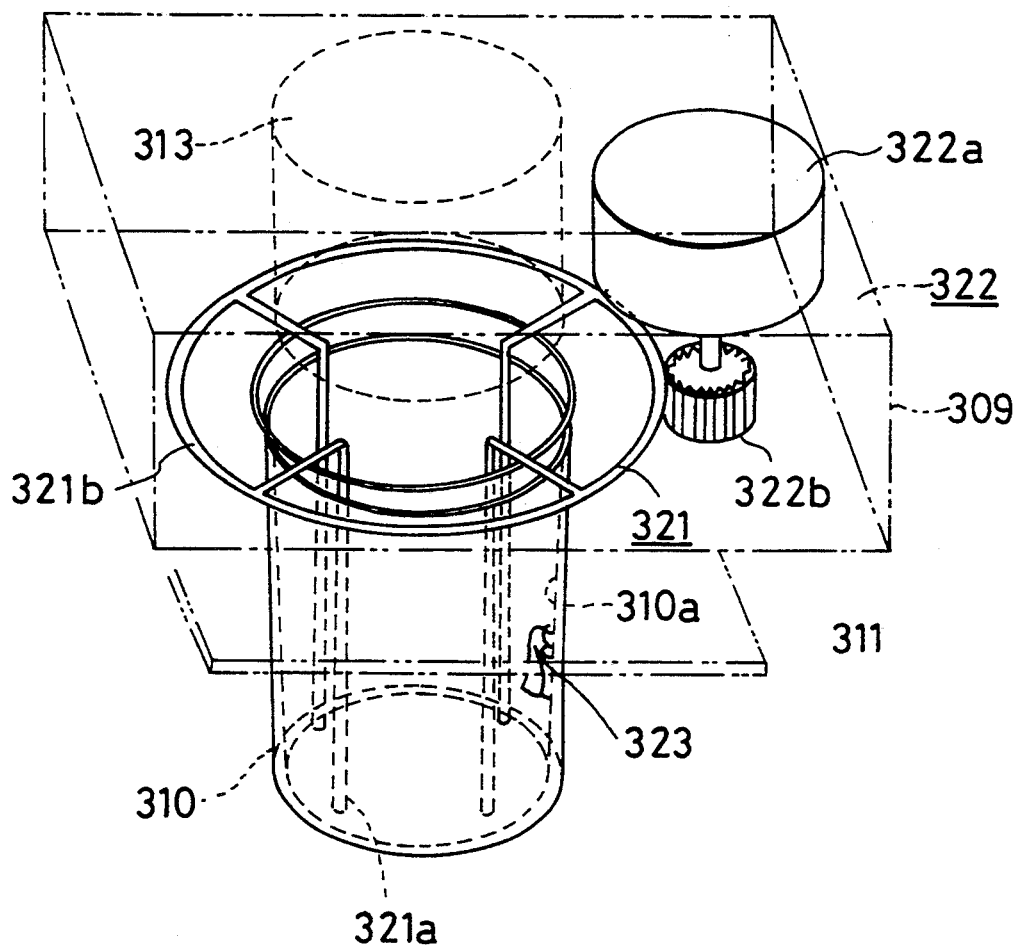
FIG. 23 is a perspective view showing a metering container used in the fourth embodiment of the present invention.

Referring now to FIGS. 21, 22 and 23, there will be described a fourth embodiment of the present invention which is based on the consideration of this point.

FIG. 21 is a perspective view showing a combination metering apparatus which incorporates 14 metering machines each using a metering container with remover, which constitutes a feature of the fourth embodiment, and FIG. 22 is a diagrammatic sectional view showing the combination metering apparatus.

In FIGS. 21 and 22, a hopper 303 is mounted on the top face of a housing 301. An object of metering, such as pickled vegetables, is introduced into the hopper 303 from behind by means of a supply container 302. The object of metering collected in the hopper 303 is supplied through guides 305 to 314 supply cups 306, which are attached to the front face of the housing 301, by means of, for example, transportation screws 304. The supply cups 306, which are each in the form of a cylinder open at its top and bottom ends, are slidably mounted on a slide plate 307. Further, the supply cups 306 are moved back and forth, in the directions indicated by the arrow of FIG. 22, on the slide plate 307 by means of drive mechanisms 308 in the housing 301, which utilize, for example, compressed air.

Arranged under the individual supply cups 306 are casings 309 each containing a remover rotating mechanism, containers 310, and metering bases 311, which constitute the metering machines, individually. Since the 14 metering machines are linearly arranged, as mentioned before, the casings 309, container bodies 310, and metering bases 311 are also linearly arranged in sets of 14. Each container body 310, which is in the form of a cylinder made of, for example, plastic material and open at its top and bottom ends, is slidably mounted on the upper surface of each corresponding metering base 311. The container bodies 310, like the supply cups 306, are moved back and forth, in the directions indicated by the arrow of FIG. 22, on the metering bases 311 by means of drive mechanisms 312 in the housing 301, which utilize, for example, compressed air.

Each casing 309 has a through hole 313 through which the object of metering dropped through the bottom opening of the supply cup 306, pushed out to the front of the slide plate 307, is fed into the container body 310. Further, each metering base 311 incorporates, for example, a load cell, which has a function to measure the weight of the article placed on the metering base 311. In this embodiment, a weight value of only the object of metering, obtained by subtracting the weight of the container body 310 from the measured weight, is outputted.

A table 314 is disposed under the 14 metering machines, and a discharge port 316, which opens into a discharge chute 315, is bored through the center of table 314. Arranged on the upper surface of the table 314 are a pair of collecting arms 317a and 317b for collecting the object of metering, dropped onto the table 314 through the respective bottom openings of the container bodies 310 pushed out to the front of the individual metering bases 311, into the discharge port 316. The collecting arms 317a and 317b are driven by means of a drive mechanism 318 in the housing 301.

A belt conveyor 319 is disposed under the table 14, and the object of metering with a predetermined weight, supplied through the discharge chute 315, is collected into one of collecting containers 320 which are arranged on the belt conveyor 319. The collected object of metering with the predetermined weight in the collecting container 320 is transported to a bagging process in the next stage.

FIG. 23 is a diagrammatic view showing an outline of the metering container of each metering machine.

As shown in FIG. 23, four rods 321a of, e.g., stainless steel are vertically arranged at regular intervals in the circumferential direction, at a fine distance of, e.g., 1 mm from an inner peripheral surface 310a of the cylindrical container body 310 open at its top and bottom ends. The upper end of each rod 321a is bent and fixed to an annular ring 321b. Gear grooves are formed on the outer peripheral surface of the ring 321b. A motor 322a is provided in the casing 309, and a gear 322b, which is in mesh with the gear grooves on the outer peripheral surface of the ring 321b, is mounted on the shaft of the motor 322a. When the motor 322a is rotated, therefore, the ring 321b rotates through the medium of the gear 322b. When the ring 321b rotates, the four rods 321a attached to the ring 321b move in the circumferential direction along the inner peripheral surface 310a. Thus, an object 323 of metering adhering to the inner peripheral surface 310a is separated from the inner peripheral surface 310a as the rods 321a move.

The rods 321a and the ring 321b constitute a remover 321, while the motor 322a and the gear 322b constitute a remover rotating mechanism 322 for rotating the remover 321.

In the state shown in FIG. 21, the container body 310 is retreated to the rear of the metering base 311 by means of the drive mechanism 312. When the container body 310 is pushed out to the front of the metering base 311, the gear 322a of the motor 322a is in engagement with the gear grooves of the ring 321b of the remover 321. When the container body 310 is placed on the metering base 311, the ring 321b is retreated as in FIG. 21, so that the ring 321b and the gear 322b are separated from each other. If the motor 322a is rotated in this state, therefore, the remover 321 never rotates.

The following is a description of the operation of the combination metering apparatus constructed in this manner.

First, when the object of metering, such as pickled vegetables, is fed from the supply container 302 into the hopper 303, the transportation screws 304 are actuated to supply a predetermined quantity of the object of metering to the individual supply cups 306. Subsequently, when the drive mechanisms 308 are actuated, the supply cups 306 are pushed out to the front of the slide plate 307, so that the individual batches of the object of metering contained in the supply cups 306 drop through the respective through holes 313 of the casings 9 into the container bodies 310 placed on the metering bases 311.

In this state, the respective weights (net weights) of the batches of the object of metering contained in the individual container bodies 310 are measured individually by means of the metering bases 311. Then, necessary weights values are selected among 14 weight values so that a predetermined weight can be obtained. Only the respective drive units 312 of those container bodies 310 which contain the batches of the object of metering individually having the selected weight values are driven to push out the container bodies 310 concerned to the front of their corresponding metering bases 311. As a result, only those batches of the object of metering contained in the pushed-out container bodies 310 drop onto the table 314 below.

In this case, the respective motors 322a of the remover rotating mechanisms 322 for those container bodies 310 which are pushed out forward are rotated. Thereupon, each remover 321 rotates, so that the object 323 of metering, adhering to the inner peripheral surface 310b without having dropped through the bottom opening, is separated from the inner peripheral surface 310a and drops.

The batches of the object of metering dropped on the table 314 are put together in the discharge port 306 by means of the collecting arms 317a and 317b, and then collected into one of the collecting containers 320 on the belt conveyor 319 through the discharge chute 315. The object of metering with the predetermined weight, collected in the collecting container 320, is transported to the bagging process in the next stage by means of the belt conveyor 319.

In this manner, a combination metering process for the one collecting container 320 is finished. In the next combination metering process, it is necessary only that the object of metering be supplied from the supply cups 306 to only those empty container bodies 310 which are used in the present combination metering process, so that the respective transportation screws 304 and drive mechanisms 308 of the supply cups 306 concerned are driven.

Thus, the object 323 of metering, adhering to the inner peripheral surface 310a of the container body 310 without having dropped, can be separated and securely caused to drop by only attaching the remover 321 and the remover rotating mechanism 322 to each container body 310. Consequently, the weight of the object of metering (article of trade) collected in the collecting container 320 can be correctly adjusted to a preset value.

According to the fourth embodiment of the present invention, as described above, the remover formed of a plurality of rods arranged in the inner peripheral surface of the container body is provided in the container body, and the remover is rotated by means of the remover rotating mechanism with the container body off the metering base. When the container body is pushed out of the metering base, therefore, the object of metering adhering to the inner peripheral surface can be securely caused to drop, so that the accuracy of measurement of the weight of the dropped object of metering can be considerably improved.

The following is a description of a metering apparatus according to a fifth embodiment, which is provided with a transportation screw control mechanism for improving the mode of rotation of the transportation (supply) screws.

Figure 24:
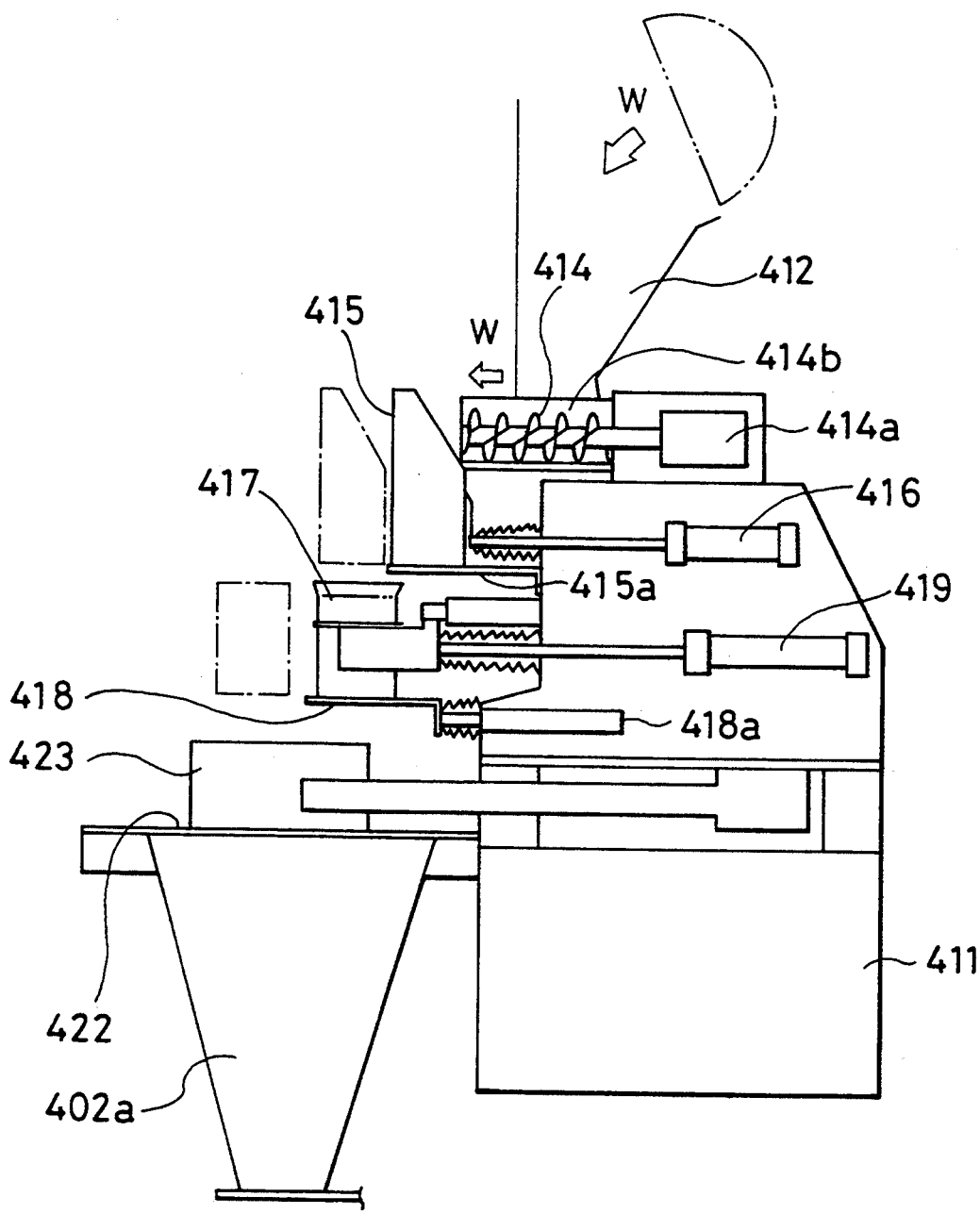
FIG. 24 is a side view showing a combination metering machine according to a fifth embodiment of the present invention.
Figure 25:
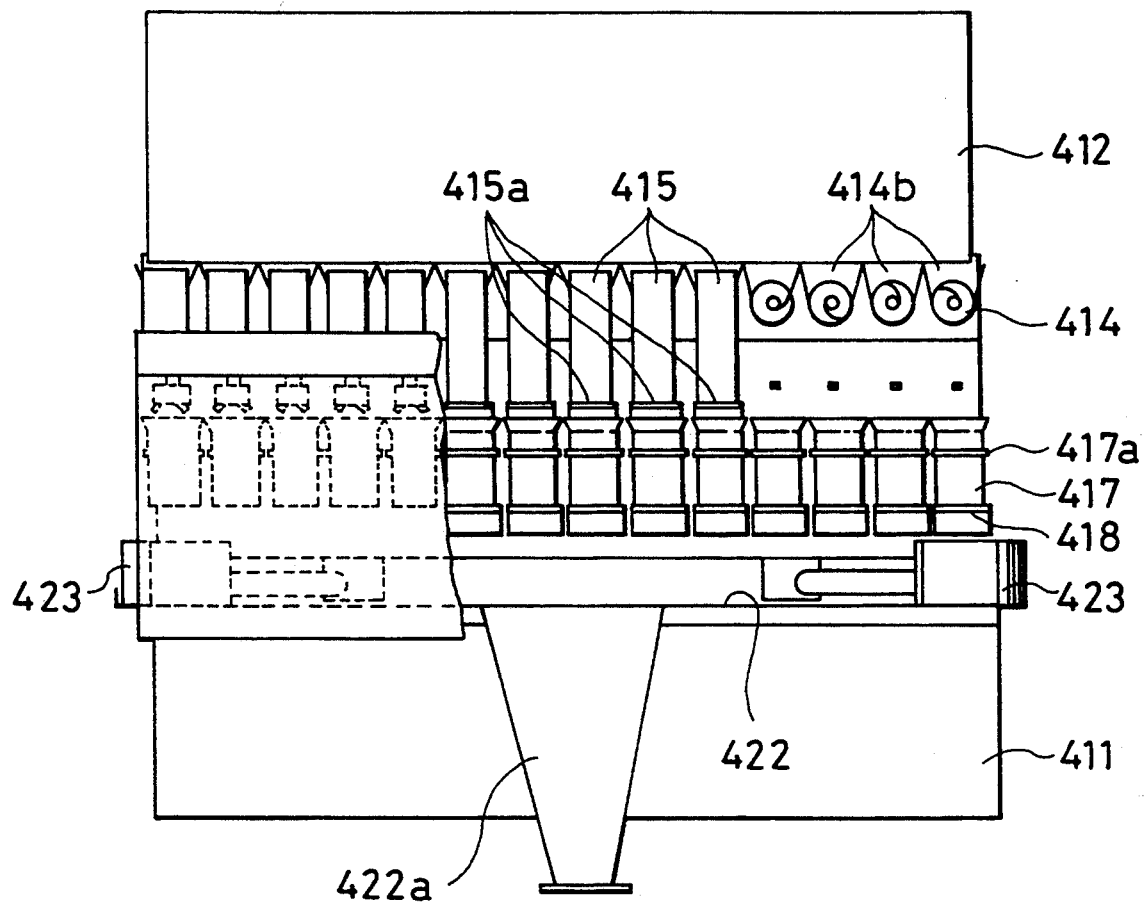
FIG. 25 is a front view of the same metering machine.

FIG. 24 is a side view showing a combination metering machine according to this fifth embodiment, and FIG. 25 is a front view of the metering machine.

In this combination metering machine, an introduction hopper 412 is provided on the top portion of an apparatus housing 411, and the work W is introduced into the hopper 412. A plurality of transportation screws 414 are arranged side by side under the introduction hopper 412.

Each transportation screw 414 is disposed in an open-topped conical guide path 416b. As a drive section 414a at the proximal end of the transportation screw 414 is rotated, the work W is transported forward with respect to the metering machine, from the position under the introduction hopper 412, on the proximal end side, to the distal end portion of the transportation screw 414.

A plurality of cylindrical pool hoppers 415 are arranged corresponding in position to the respective distal end portions of the transportation screws 414. The pool hoppers 415 are mounted individually on base plates 415a which are fixed to the housing 411. As a cylinder 416 extends, each pool hopper 415, containing the work W, moves beyond the front end of each base plate 415a, thereby causing a predetermined quantity of the work W to drop downward.

A plurality of cylindrical metering hoppers 417 are arranged at positions to which the work W drops. The metering hoppers 417 are mounted individually on independent base plates 418. The base plates 418 are connected to metering load cells 418a arranged in the housing 411, and the metering load cells 418a weigh the work W. A desired variable can be obtained by combining variables for the individual metering hoppers 417. By extending a cylinder 419, only an assigned one of the metering hoppers 417 is moved beyond the front end of each corresponding base plate 418, thereby dropping the work W therein.

A flat collecting plate 422 is disposed under the metering hoppers 417. A scraper 423 for scraping up the work W on the collecting plate 422 to the central portion is arranged on the collecting plate 422.

The work W collected by means of the scraper 423 is delivered to the next stage through a collecting chute 422a.

In the combination metering machine constructed in this manner, the following adverse effect is liable to be entailed if the transportation screws 414 are rotated in a mode such that the work W is advanced only in one direction.

In a metering apparatus which uses transportation screws for intermittently transporting the object of metering (work) with respect to the pool hoppers, the work is liable to drop when the transportation is stopped, a predetermined quantity of the work cannot be transported at the time of transportation, and the work may possibly be caught and destroyed by the transportation screws. As a result, high-accuracy metering cannot be effected at high speed.

Figure 26:
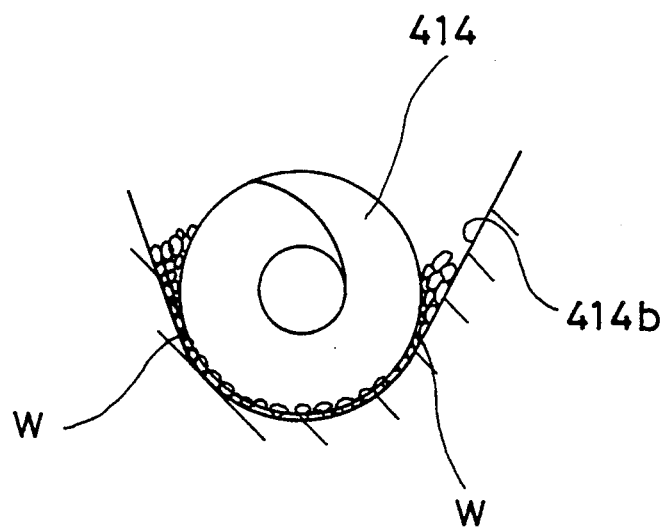
FIG. 26 is a partial front view of a transportation screw.

More specifically, each transportation screw 414a is disposed in the open-topped conical guide path 414b, and the work w is transported along the guide path 414b by means of the transportation screw 414a. Depending on the kind of the work W, therefore, the work W is liable to be caught in between the transportation screw 414a and the guide path 414b, as shown in the partial front view of FIG. 26.

In this case, the transportation screw 414a is locked, and therefore, cannot rotate. If it is urged to rotate by force, the transportation screw 414a or the work W may possibly be damaged.

The work w may be supplied in a manner such that it is transported by only rotating the transportation screw 414a, the work W is supplied to the pool hopper 415 in synchronism with the rotation of the transportation screw 414a, and the transportation screw 414a is stopped to interrupt the supply when the predetermined quantity of the work W is supplied to the pool hopper 415. According to this supply mode, however, the work W at the distal end portion of the transportation screw 414a may probably drop into the pool hopper 415 after the transportation screw 414a is stopped.

Thus, the variables of the work W are irregular, so that high-accuracy combination metering is subject to limitation.

Accordingly, this fifth embodiment is provided with the transportation screw control mechanism arranged as follows. This mechanism controls the flow of the work W in the combination metering machine shown in FIGS. 24 and 25 in accordance with stored values based on the learning function of a control section 450 formed of a CPU or the like, so that the drive variable of the drive motor 414a, such as a pulse motor, for rotating the transportation screw 414 is optimum, as shown in FIG. 27.

Thus, before starting initialization, variables of the work W corresponding to rotation variables of the drive motor 414a are stored beforehand, and the rotation variables of the drive motor 414a is controlled in order to correspond to various desired variables for the combination metering in the regions of the individual metering hoppers 417.

The flow chart of FIG. 28 shows a rotation control mode for the transportation screw according to the present embodiment.

The transportation screw 414 is intermittently rotated by intermittent operation of the drive motor 414a.

First, the control section 450 shown in FIG. 27 controls the drive motor 414a, formed of a pulse motor, by means of a pulse generator 451 and a motor driver 452, thereby forwardly rotating the transportation screw 414 for a predetermined variable (Step SP1). As a result, the transportation screw 44 rotates in the forward direction, so that the work w is taken out from under the introduction hopper 412, and transported and supplied to the pool hopper 415 in order (Step SP2).

After the transportation screw 414 is rotated for the predetermined variable by means of the learning function of the control section 450 based on the comparison between various variable data entered in the control section 450 and the aforesaid initially stored values, the transportation screw 414 stops (Step SP3). In this state, the predetermined quantity of the work W is contained in the pool hopper 415. After this batch of the work W is transferred to the metering hopper 417 and weighed thereby, thereafter, it is combined with the batches of the work W in the other metering hoppers 417 to a predetermined weight, and the work W is discharged.

Then, the transportation screw 414 rotates for a predetermined variable (e.g., one revolution) in the reverse direction in accordance with a command from the control section 450 (Step SP4). Thereupon, a predetermined quantity of the work w moves back in the direction opposite to the transportation direction. Accordingly, the work W at the respective distal end portions of the transportation screw 414 and the guide path 414b can be prevented from dropping from the guide path 414b into the pool hopper 415 after the transportation screw 414 is stopped.

Thus, the work W is transported and supplied to the pool hopper 415 only when the transportation screw 414 rotates, and is prevented from naturally dropping into the pool hopper 415 when the transportation screw 414 is stopped, so that the rotation control can be related to the transportation variables more accurately.

The rotation control of the transportation screw 414 is intermittently continued for a period before the combination metering machine is stopped (Step SP5) every time the work W in the pool hopper 415 is supplied to the metering hopper 417.

The transportation screw 414 is designed so as to rotate reversely after forwardly rotating for predetermined revolutions with every cycle of intermittent operation. Even if the work W has an inclination to be easily caught in between the transportation screw 414 and the guide path 414b, therefore, the work W can escape before it gets jammed or locked in the transportation screw 414, as the transportation screw 414 rotates reversely. Accordingly, the work W can be transported with stability without influencing the continuous operation.

Figure 29:
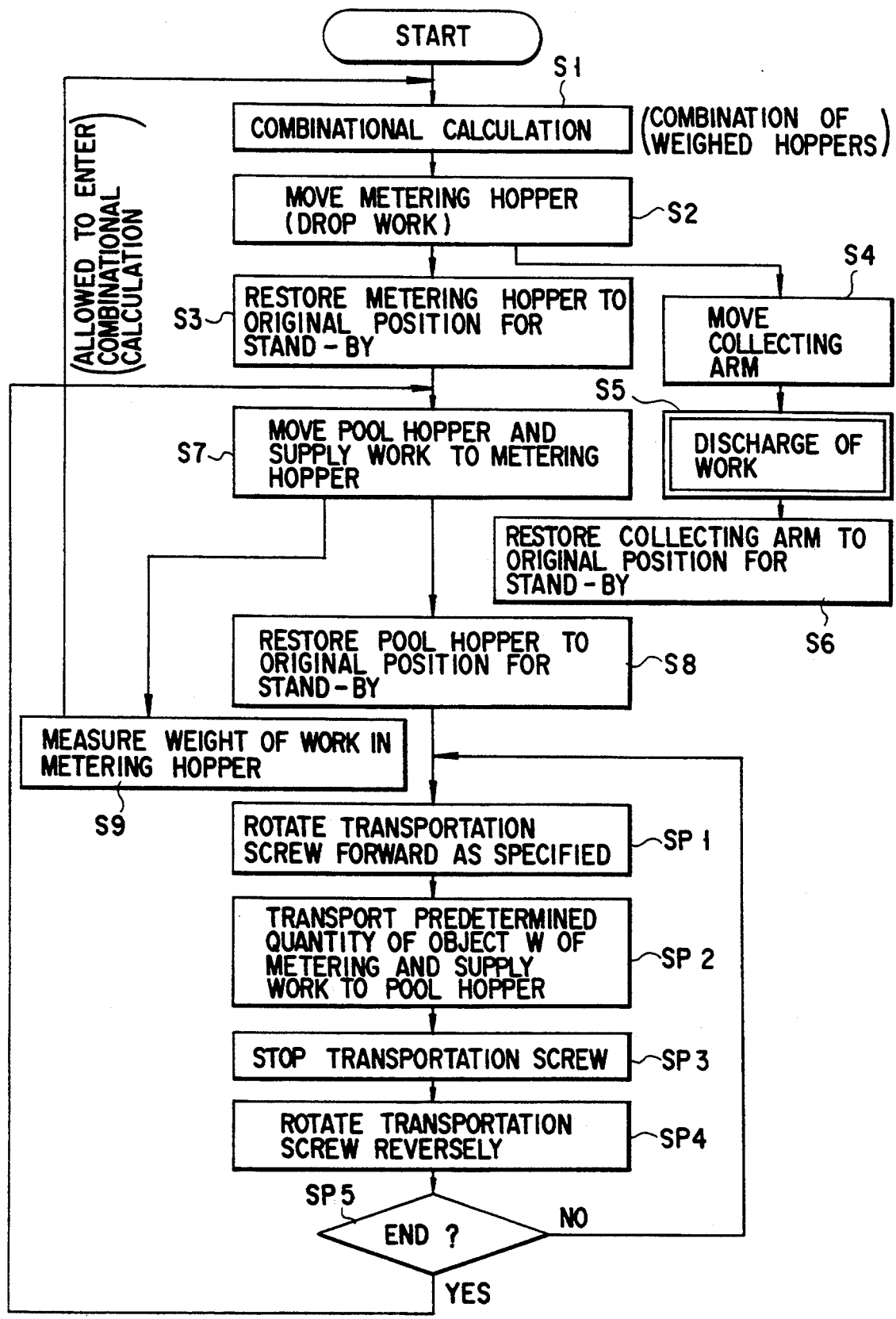
FIG. 29 is a flow chart for illustrating the general operation of the combination metering machine according to the present invention.
Figure 30:
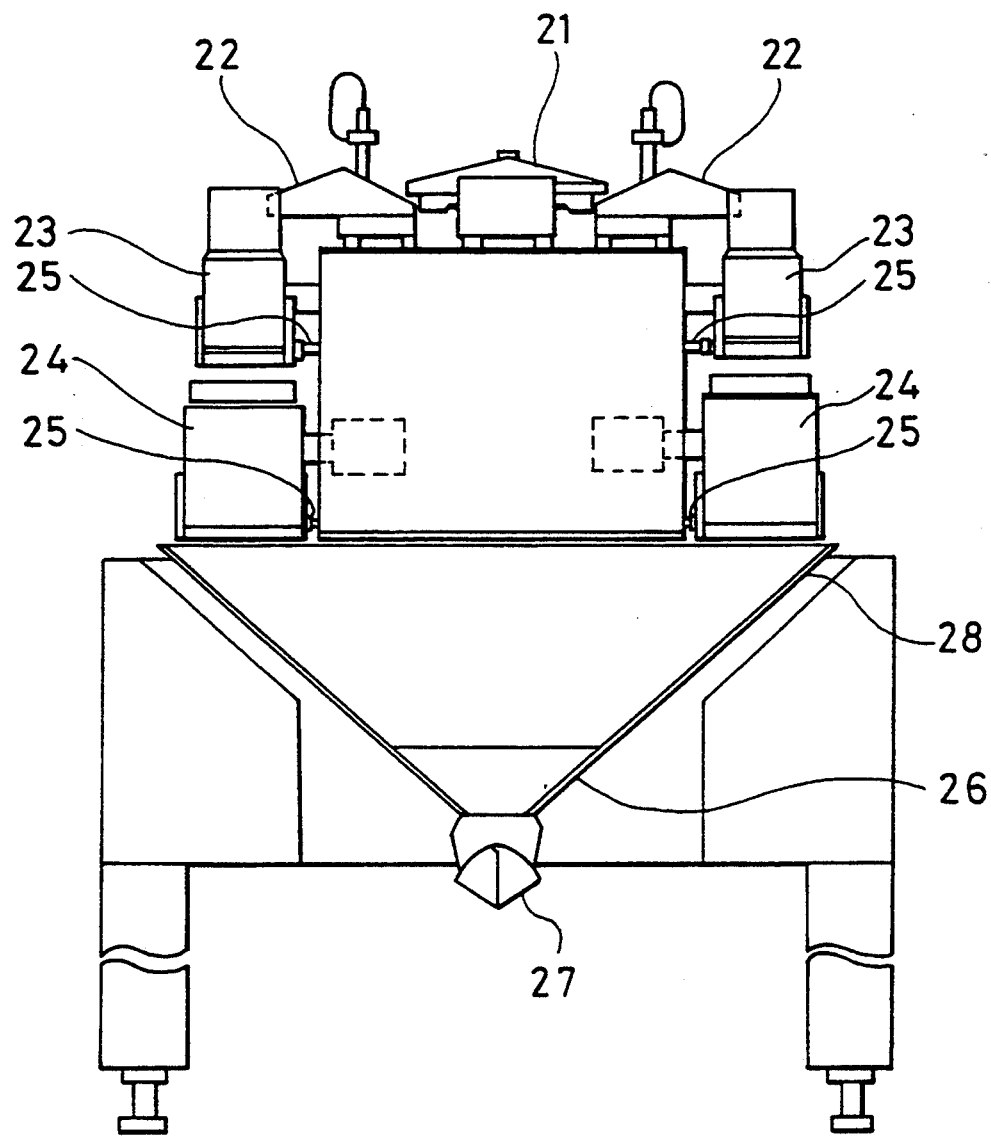
FIG. 30 is a cutaway side view showing a conventional combination metering machine.
Figure 31:
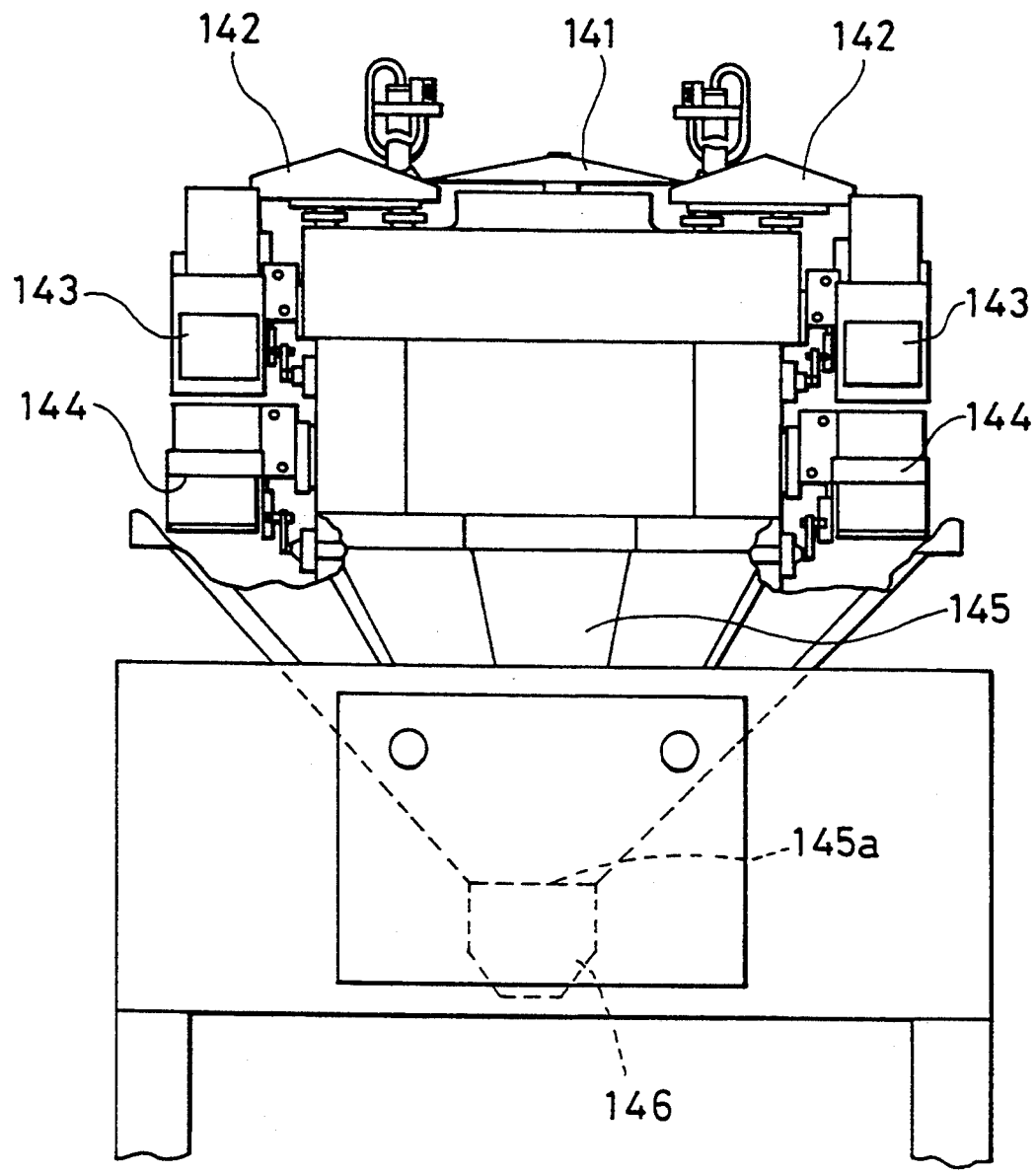
FIG. 31 is a front view showing the conventional combination metering machine.
Figure 32:
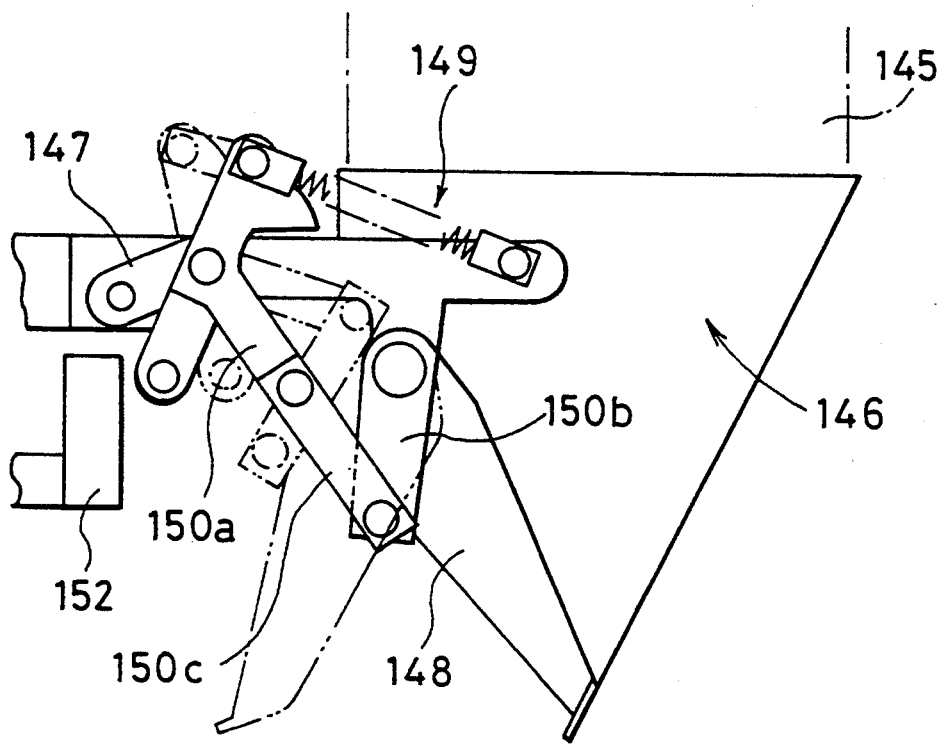
FIG. 32 is a side view showing a conventional discharge hopper portion.

In order to control the whole combination metering machine on the basis of the operation flow shown in FIG. 29, as well as to control the transportation screw 414 in the aforesaid manner as the transportation screw control mechanism, the control section 450 is connected to a pool hopper drive cylinder 453, a metering hopper cylinder 454, an arm drive source 455, and other necessary specific parts (not shown), as shown in FIG. 27.

Referring to the flow chart of FIG. 29, the control section 450 first orders a combinational calculation in order to determine the selective combination of those metering hoppers which have undergone weight measurement (Step S1). Then, after ordering the metering hoppers to move or drop the work downward (Step S2), the control section 450 orders that the metering hoppers should be restored to their original positions for stand-by (Step S3), orders the collecting arms to move, thereby discharging the work, and then orders that the collecting arms should be restored to their original positions for stand-by (Steps S4, S5 and S6). After the execution of Step S3, moreover, the control section 450 orders that the pool hoppers should be moved to supply the work to the metering hoppers (Step S7), and thereafter, orders that the pool hoppers should be restored to their original positions for stand-by (Step S8). This process of Step S8 is followed by the aforesaid processes of Steps SP1 to SP5 for controlling the transportation screw.

After executing Step S7, the control section 450 orders the measurement of the weight of the work in the metering hoppers (Step S9). As a result, those metering hoppers which can take part in the aforementioned combinational calculation in Step S1 are determined.

This operation flow of the whole combination metering machine may be also applied to the foregoing first to fourth embodiments.

Although the above embodiment has been described as an example applied to the intermittently operating transportation screws provided in the combination metering machine, it is not limited to the combination metering machine, and may be also applied in general to those metering apparatuses which are provided with intermittently operating transportation screws. Also in this case, the same functions and effects of the above embodiment can be obtained.

According to the fifth embodiment arrangement in this manner, the intermittently operating transportation screw forwardly rotates to transport the predetermined quantity of the work corresponding to the number of revolutions, from its proximal end side to its distal end side, in the guide path portion, stops after rotating for the predetermined revolutions, and thereafter, makes at least one reverse revolution. Thus, the work at the distal end side of the guide path is moved back and prevented from dropping from the guide path end position, so that a fixed quantity of the work can be intermittently transported at all times.

Since the transportation screw is rotated reversely, moreover, the work can be transported and supplied with stability without being caught in between the transportation screw and the guide path.

INDUSTRIAL APPLICABILITY

The metering apparatus of the present invention can be widely applied to combination metering machines and other metering machines at large which require high-accuracy metering for various works including sticky materials (watery materials) such as foodstuffs.

What is claimed is:

1. A combination weighing machine for weighing an object of weighing, said machine comprising:
   an apparatus housing having a top portion;
   introduction hopper mean provided on the top portion of said apparatus housing, for introducing the object of weighing into said apparatus housing;
   a plurality of supply feeder means horizontally arranged in a straight line under said introduction hopper means, for feeding the object of weighing introduced in said introduction hopper means to a forward portion of said apparatus housing;
   a plurality of pool hopper means provided on said forward portion of said apparatus housing corresponding to said plurality of supply feeder means, for receiving the object of weighing with a predetermined quantity thereof fed by said plurality of supply feeder means;
   first base plate means for carrying said plurality of pool hopper means thereon, said first base plate means being relatively slidable with respect to said plurality of pool hopper means to temporarily store predetermined quantities of the object of weighing received individually by said plurality of pool hopper means and to supply the object of weighing to a lower stage thereof;
   a plurality of weighing hopper means provided under said first base plate means and corresponding to said plurality of pool hopper means, for receiving the object of weighing supplied from said plurality of pool hopper means to the lower stage by use of said first base plate means;
   a plurality of second base plate means, each for carrying said plurality of weighing hopper means thereon, each of said second base plate means including means for individually weighing said predetermined quantities of the object of weighing supplied correspondingly from said plurality of pool hopper means to said plurality of weighing hopper means, and each of said second base plate means being relatively slidably individually with respect to said plurality of weighing hopper means to supply a weighed object of weighing in selective combinations to a lower stage thereof; and
   collecting means for collecting said weighed object of weighing supplied in selective combinations from said plurality of weighing hopper means by use of said plurality of second base plate means,
   wherein each of said plurality of pool hopper means and said plurality of weighing hopper means comprises a hollow, bottomless straight barrel-type container, and each barrel-type container has a plurality of indentations on an inner peripheral wall thereof, said indentations extending along the length of the respective barrel-type container in the direction of the barrel axis thereof, said indentations each defining projections for contacting said object of weighing with substantially point contact to enable discharge of substantially all of said object of weighing from the respective barrel-type container, and
   said plurality of supply feeder means each comprises:
   a transportation screw provided in a guide path for transporting the object of weighing;
   a drive motor for intermittently rotating said transportation screw; and
   control means for controlling said drive motor so as to transport a predetermined quantity of the object of weighing from a proximal end side of said guide path to a distal end side of said guide path through said transportation screw,
   said control means including:
   means for causing said drive motor to forwardly rotate said transportation screw for a predetermined variable amount for thereby transporting the object of weighing, and said control means then stopping the forward rotation of said transportation screw for stopping movement of the object of weighing; and
   means for causing said drive motor to reversely rotate said transportation screw for at least one revolution after movement of the object of weighing is stopped.

2. A combination weighing machine according to claim 1, wherein each of said hollow, bottomless straight barrel-type containers includes a main body portion and an introduction opening portion, said introduction opening portion having a larger diameter than that of said main body portion, and said introduction opening portion being located at a top end portion of said main body portion.

3. A combination weighing machine according to claim 1, wherein said collecting means includes an arm mechanism.

4. A combination weighing machine according to claim 1, wherein said collecting means includes a conveyor.

5. A combination weighing machine according to claim 1, wherein said collecting means includes a chute.

6. A combination weighing machine according to claim 1, wherein:
said weighing hopper means each include a container; and
said collecting means includes an actuator means for relatively moving a container of a weighing hopper means and said second base plate means in accordance with a property of the combined weighing by said weighing means, thereby causing said object of weighing to be discharged to different discharge portions, in accordance with said property.

7. A combination weighing machine according to claim 6, wherein said actuator means includes a swing arm.

8. A combination weighing machine according to claim 1, wherein said drive motor comprises a pulse motor.

* * * * *